United States Patent [19]

Baba et al.

[11] Patent Number: 5,063,814
[45] Date of Patent: Nov. 12, 1991

[54] LINE PRESSURE CONTROL SYSTEM FOR AUTOMATIC TRANSMISSION

[75] Inventors: Fumiaki Baba, Higashi-Hiroshima; Hiroshi Yoshimura, Hiroshima; Takuji Fujiwara, Hiroshima; Kozo Ishii, Hiroshima, all of Japan

[73] Assignee: Mazda Motor Corporation, Hiroshima, Japan

[21] Appl. No.: 569,994

[22] Filed: Aug. 20, 1990

[30] Foreign Application Priority Data

Aug. 23, 1989 [JP] Japan .................................. 1-217014
Aug. 29, 1989 [JP] Japan .................................. 1-222574
Dec. 22, 1989 [JP] Japan .................................. 1-333732

[51] Int. Cl.$^5$ ............................................. B60K 41/08
[52] U.S. Cl. ..................................... 74/866; 364/424.1
[58] Field of Search ......................... 74/866; 364/424.1

[56] References Cited

U.S. PATENT DOCUMENTS 3,750,495  8/1973  Ito et al. ................................. 74/866
4,868,753  9/1989  Mori ...................................... 364/424.1
4,870,581  9/1989  Ito et al. ............................. 74/867 X
4,953,090  8/1990  Narita ................................... 364/424.1

Primary Examiner—Allan D. Herrmann
Assistant Examiner—William O. Trousdell
Attorney, Agent, or Firm—Fleit, Jacobson, Cohn, Price, Holman & Stern

[57] ABSTRACT

A line pressure control system for an automatic transmission, including a multiple shift stage transmission gear mechanism having a plurality of power transmitting paths of different speed ratios, has a line pressure control device for controlling a line pressure for frictional elements of the transmission gear mechanism associated with each other to establish a desirable shift gear stage. A shift period detector detects a time period for a shift operation, accomplished in terms of operation of the frictional elements controlled by the line pressure. A first compensating device controls the line pressure in terms of a learing control in a manner such that the time period for the shift operation is controlled to a target value. An abnormality detecting device detects an abrupt change, such as a turbine speed rise or, depression, or a driving torque depression in an operating condition of the transmission. A second compensating device compensates the line pressure prior to compensation of the line pressure by the first compensating device when the abrupt change is detected. The torque shock can be effectively obviated during a shift operation.

11 Claims, 23 Drawing Sheets

| STAGE \ THROTTLE OPENING | 0/8 | 1/8 | | 7/8 | 8/8 |
|---|---|---|---|---|---|
| 1 → 2 | (Pℓ) | ---- | | ---- | ---- |
| 1 → 3 | ---- | ---- | | ---- | ---- |
| 1 → 4 | ---- | ---- | | ---- | ---- |
| 2 → 3 | ---- | ---- | | ---- | ---- |
| 2 → 4 | ---- | ---- | | ---- | ---- |
| 3 → 4 | ---- | ---- | | ---- | ---- |

| STAGE \ TURBINE SPEED | 0 | 750 | | 5250 | 6000 |
|---|---|---|---|---|---|
| 3 → 2 | (PℓO) | ----- | | ----- | ----- |

| ΔN | 0 | 40 | 80 | 120 | 160 | (rpm) |
|---|---|---|---|---|---|---|
| LN(ΔN) | 0 | 1 | 2 | 3 | 4 | (0.02kg/cm²/bit) |

LINE PRESSURE CONTROL SYSTEM FOR AUTOMATIC TRANSMISSION

CROSS-REFERENCE TO RELATED APPLICATION

The present application relates to co-pending U.S. patent application Ser. No. 424,763, filed on Oct. 20, 1989, entitled "LINE PRESSURE CONTROL SYSTEM FOR AUTOMATIC TRANSMISSION" which is assigned to the same assignee as the present application.

BACKGROUND OF THE INVENTION

1. Field of the Invention

This invention relates to a line pressure control system for an automatic transmission of a vehicle, and more specifically to a control system for controlling a line pressure by controlling a pressure regulating valve through a solenoid thereof.

2. Description of the Related Art

Generally, an automatic transmission is provided with a torque converter and a multiple stage transmission gear mechanism with a planetary gear mechanism. The transmission gear mechanism is provided with a plurality of frictional elements, such as brakes and clutches for switching a power transmitting path therein to establish a desirable shift gear staged. The frictional elements are adapted to be controlled by a hydraulic control circuit to be engaged and disengaged to make a shift operation. Since the line pressure seriously affects engaging force and switching speed of the frictional elements, or shift shock in shift operation, it is necessary to deliberately control the line pressure.

There has been known a line pressure control system for electrically controlling the line pressure of a hydraulic control circuit of the transmission mechanism which includes a pressure regulating valve for controlling the line pressure of which pilot pressure is controlled by a duty solenoid valve. According to the conventional line pressure control system, the line pressure is controlled by a duty ratio signal for the duty solenoid valve so that a desirable frictional engaging force is obtained in accordance with the magnitude of engine torque. Alternatively, the line pressure is controlled to obviate the shift shock during the shift operation. In this case, it is necessary to properly control timing of a switching operation and a change of the engaging force of the frictional elements between the engaged and disengaged position. Otherwise, a torque shock is undesirably produced, because of an improper change in the turbine and the engine speeds.

In view of these problems, it has been known to control the line pressure in terms of a time period of the shift operation. For example, Japanese Patent Publication 63-3183 discloses a learning control of the line pressure for controlling the frictional elements wherein the time period of the shift operation is measured for changing the line pressure in a manner that the time period of the shift operation is controlled to a target value. The line pressure control disclosed in the Japanese Patent Publication 63-3183 is intended to make the time period of the shift operation constant to prevent shift shock and restrict undue slip in the frictional elements.

It should, however, be noted that the above learning control of the line pressure is disadvantageous in the following points.

In one condition of the shift operation, a frictional element is associated with a one way clutch to accomplish a shift operation. In the other condition, one frictional element is released or goes off and another frictional element is engaged or comes on to accomplish a shift operation. In the one condition of the shift operation, the shift operation can be made without serious torque shock, since a power transmitting path can be switched smoothly. However, in the other condition of the shift operation, releasing timing of the one frictional element is not determined in accordance with engaging timing of the other frictional element so that a change rate of capacity for transmitting torque through the one frictional element does not correspond to that for the transmitting torque through the other frictional element. As a result, even when the torque capacity of the one frictional element is reduced, turbine speed may produce temporarily an abrupt increase where the torque capacity of the other frictional element is not increased sufficiently. Secondly, when the torque capacity of the other frictional element is increased sufficiently, the turbine speed is reduced quickly to produce a depression of the turbine speed. Thirdly, when the one frictional element keeps a large amount of capacity and the other frictional element increase the torque capacity thereof rapidly, both of the frictional elements are kept in a substantially engaged condition so that the engine torque is abruptly reduced to produce a torque depression as well. Thus, the element will be deteriorated in durability and reliability even where the time period for the shift operation is precisely controlled.

SUMMARY OF THE INVENTION

It is, therefore a primary object of the invention to prevent unusual shift operation such as abrupt increase or depression of the engine and/or turbine speed.

Another object of the invention is to provide a control system for an automatic transmission in which an increase in rotation speed of an input member of the transmission can be accurately detected to provide a proper control of a line pressure for frictional elements of the transmission during shift operation.

Still another object of the invention is to provide a line pressure control system for an automatic transmission in which a line pressure for frictional elements is controlled based on a turbine speed change to reduce the shift shock.

Yet another object of the invention is to provide a line pressure control system of an automatic transmission in which a line pressure is controlled at an initial stage of a shift operation to accomplish a prompt control of the line pressure.

The above object of the invention can be accomplished by a line pressure control system for an automatic transmission for controlling a line pressure so as to adjust a switching timing of frictional elements involved in the shift operation prior to a learning control for the line pressure in which a time period for the shift operation is controlled to a target value.

According to the present invention, a line pressure control system for an automatic transmission comprises a multiple shift stage transmission gear mechanism having a plurality of power transmitting paths of different speed ratios, line pressure control means for controlling a line pressure for frictional elements of the transmission gear mechanism associated with each other to establish a desirable shift gear stage, shift period detecting means for detecting a time period for a shift operation accomplished in terms of operation of the frictional element controlled by the line pressure, first compensating means for controlling the line pressure in terms of a learning control in a manner that the time period for the shift operation is controlled to a target value, abnormality detecting means for detecting an abrupt change in operating condition of the transmission, and second compensating means for compensating the line pressure prior to compensation of the line pressure by the first compensating means when the abrupt change is detected.

Preferably, the abnormality detecting means detects an abrupt rise in a rotation speed of an input member of the automatic transmission during the shift operation. The abnormality detecting means may detect a depression in a rotation speed of an input member of the automatic transmission during the shift operation. Alternatively, the abnormality detecting means may detect a depression in a driving torque transmitted through frictional elements of the transmission gear mechanism during the shift operation.

In a preferred embodiment, the line pressure control means comprises a duty solenoid valve for controlling a pilot pressure of a line pressure control valve so that the line pressure is controlled. The second compensating means compensates the line pressure to be increased so as to increase the torque capacity of an on-coming frictional element of the transmission gear mechanism when the rotation speed of an input member of the transmission gear mechanism is abruptly increased during the shift operation.

The second compensating means compensates the line pressure to be decreased so as to reduce the torque capacity of an off-going frictional element of the transmission gear mechanism when the turbine speed is abruptly decreased during the shift operation.

The second compensating means compensates the line pressure to be decreased so as to reduce the torque capacity of an off-going frictional element of the transmission gear mechanism when a torque depression is produced during the shift operation.

In another aspect of the present invention, a line pressure control system for an automatic transmission comprises a multiple shift stage transmission gear mechanism having a plurality of power transmitting paths of different speed ratios, line pressure control means for controlling a line pressure for frictional elements of the transmission gear mechanism associated with each other to establish a desirable shift gear stage, input member speed detecting means for detecting a rotation speed of an input member of the transmission gear mechanism, speculating means for obtaining a speculative speed of the input member of the transmission after the shift operation based on the speed ratio and a vehicle speed before the shift operation, speed change processing means for obtaining a rotation speed raising of an actual rotation speed of the input member detected by the input member detecting means from the speculative speed of the input member, and line pressure compensating means for compensating the line pressure so as to reduce the rotation speed raising.

Preferably the line pressure control means comprises a duty solenoid valve for controlling a pilot pressure of a line pressure control valve so that the line pressure is controlled. In a preferred embodiment, a line pressure control system further comprises torque phase period detecting means for detecting a peak value of the rotation speed of the input member of the transmission gear mechanism during the shift operation and obtaining a torque phase period which is a time period between a starting time of the shift operation and a time having the peak value, inertia phase period detecting means for detecting completion of the shift operation and obtaining an inertia phase period which is a time period between the time having the peak value and the completion of the shift operation. The line pressure compensating means compensates the line pressure in the inertia phase period during the shift operation based on a length of the torque phase period and a rotation speed change amount of the input member of the transmission gear mechanism in the torque phase period. Preferably, the line pressure compensating means compensates the line pressure in the inertia phase period during the shift operation based on the rotation speed change amount of the input member of the transmission gear mechanism in the torque phase period. The line pressure compensating means may compensate the line pressure in the inertia phase period during the shift operation based on a ratio of the rotation speed change amount of the input member of the transmission gear mechanism to a length of the torque phase period.

The rotation speed of the input member can be obtained as a turbine speed of the transmission.

The line pressure is compensated to be increased so as to increase the torque capacity of an on-coming frictional element of the transmission gear mechanism when the rotation speed of the input member or turbine speed of the transmission gear mechanism is abruptly increased during the shift operation.

When the turbine speed is abruptly decreased, the line pressure is compensated to be reduced so that the torque capacity of a releasing or off-going frictional element is reduced to prevent the turbine speed depression in a succeeding shift operation.

When a torque depression is produced during the shift operation, the turbine speed change is relatively small. In view of this, when the turbine speed change is small, the line pressure is compensated so as to be reduced so that the torque capacity of the releasing or off-going frictional element is reduced promptly. This facilitates a smooth transmission of the torque between the off-going frictional element and the on-coming frictional element.

In some cases, while the compensating control of the line pressure is not consistent with the learning control for the line pressure, the learning control is carried out only when the operating condition of the transmission is changed abruptly. Therefore, the compensating control of the line pressure does not interfere with the learning control of the line pressure in which the time period of the shift operation is controlled to a target time period.

Thus, the present invention can make a learning control of the line pressure preventing the abrupt change in the operating condition of the transmission, such as the turbine speed increase, turbine speed depression, and torque depression. As a result, the present invention can suppress the torque shock during the shift operation. In addition, slippage of the frictional elements can be properly restricted to accomplish a desirable shift operation.

According to another feature of the invention, when a rotation speed of the input member of the transmission is abruptly increased, the rise of the input member speed is detected and controlled so that the line pressure is controlled to an appropriate value during the shift operation.

The above and other features of the present invention will be apparent from the detailed description of the preferred embodiment of the present invention taking reference with the accompanying drawings.

DESCRIPTION OF THE PREFERRED EMBODIMENT

Figure 1:
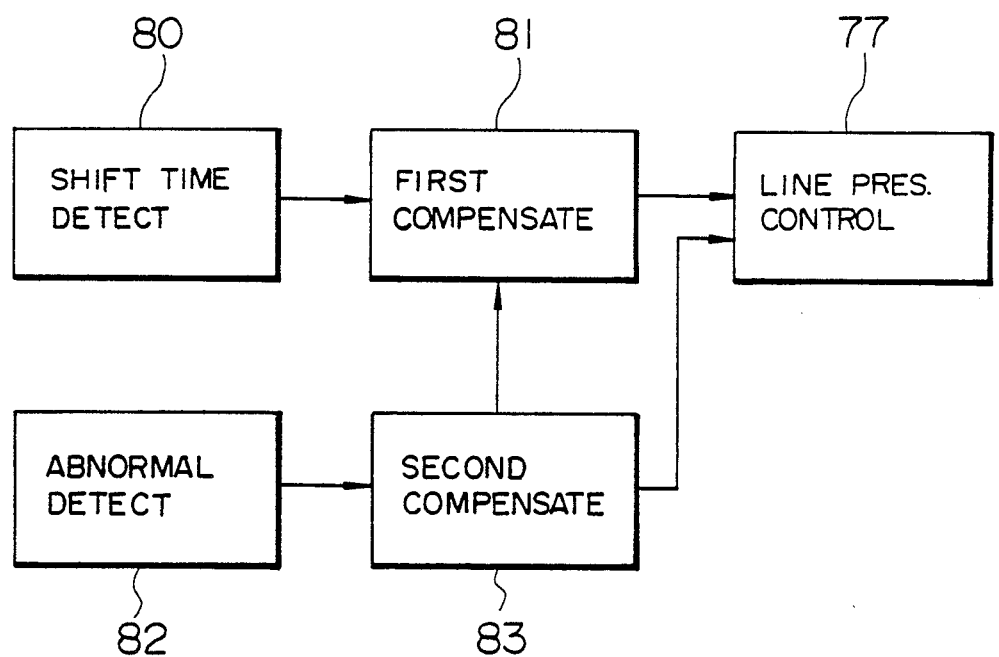
FIG. 1 is a block chart of a control system for the automatic transmission in accordance with the present invention.

There will be described a preferred embodiment of the present invention. Referring to FIG. 1, a line pressure control system for an automatic transmission in the illustrated embodiment comprises line pressure control device 77 for controlling a line pressure for frictional elements establishing a desirable shift gear stage among a plurality of shift gear stages in a multiple transmission gear mechanism, shift period detecting device 80 for detecting a time period for a shift operation accomplished in terms of operation of the frictional element controlled by the line pressure, first compensating device 81 for controlling the time period to a target value to compensate the line pressure by a learning method, abnormality detecting device 82 for detecting an abrupt change in operating condition of the transmission, and a second compensating device 83 for compensating the line pressure prior to the first compensating device 81 when the abrupt change is detected.

Figure 2:
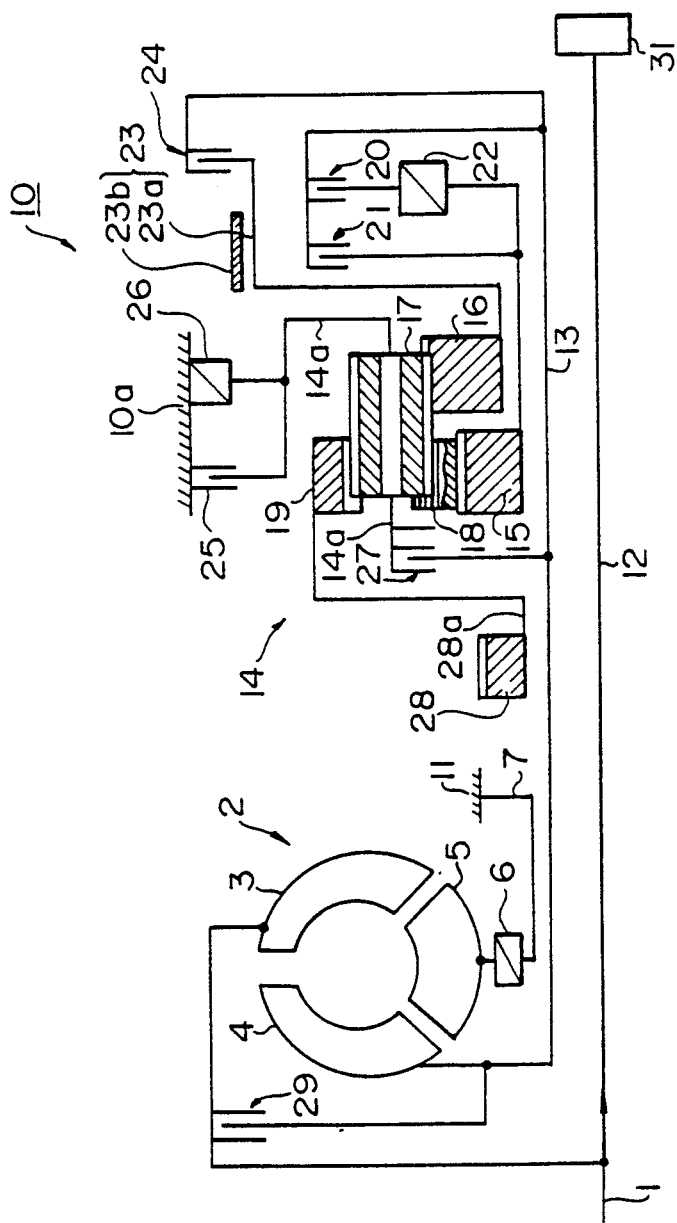
FIG. 2 is a schematic view of a control system for an automatic transmission.

Referring to FIG. 2, there is shown a structure of an automatic transmission to which the present invention can be applied. In FIG. 2, an output shaft 1 of an engine is connected with a torque converter 2. A multiple stage transmission gear mechanism 10 is disposed adjacent to an output member of the torque converter 10. The torque converter 2 is provided with a pump 3 fixed to the output shaft 1 of the engine, a turbine 4, a stator 5 mounted on a shaft 7 through a one-way clutch 6.

The gear mechanism 10 comprises an oil pump drive shaft 12 connected with the engine output shaft 1 at base end and with an oil pump 31 at a tip end thereof, a hollow turbine shaft 13 connected with the turbine 4 at a base end outside of the oil pump drive shaft 12 and Ravingneaux-type planetary gear mechanism 14 around the turbine shaft 13. The planetary gear mechanism 14 is provided with a small sun gear 15 and a large sun gear 16 which are disposed side by side in a longitudinal direction of the transmission gear mechanism 10. The planetary gear mechanism 14 is also provided with a short pinion gear 18, a long pinion gear 17 meshed with the large sun gear 16 and the short pinion gear 18, and a ring gear 19 meshed with the long pinion gear 17.

There are provided a forward clutch 20 and a coast clutch 21 side by side as frictional elements between the turbine shaft 13 and the small sun gear 15. The small sun gear 15 is connected with the forward clutch 20 located rearward of the large sun gear 16 and a first one-way clutch 22 connected with the forward clutch 22 for preventing a reverse rotation of the turbine shaft 13. The coast clutch 21 is also arranged between the turbine shaft 4, and the small sun gear 15 is in a row with the forward clutch 20 and the one-way clutch 16.

Outside of the coast clutch 21, there is disposed a 2-4 brake 23 provided with a brake drum 23a connected with the large sun gear 16 and a brake band 23b adapted to be engaged with the brake drum 23a so that when the 2-4 brake is engaged, the large sun gear is fixed. A reverse clutch 24 is arranged rearward of the brake 23 for controlling a power transmission between the large sun gear 16 and the turbine shaft 13 through the brake drum 23a to thereby establish a reverse shift stage.

There is provided a low & reverse brake 25 between a carrier 14a of the planetary gear mechanism 14 and a casing 10a of the transmission gear mechanism 10 for controlling the engagement and disengagement between the carrier 14a and the casing 10a. The long pinion 17 is connected with the low & reverse brake 25 for fixing the long pinion 17 and with a second one-way clutch 26 arranged in a row with brake 25 for allowing a rotation of the long pinion 17 in the same direction as the engine output shaft 1.

A 3-4 clutch 27 is arranged in front of the planetary gear mechanism 14 for controlling the engagement and disengagement between the carrier 14a and the turbine shaft 13. An output gear 28 disposed in front of the 3-4 clutch 27 is connected with the ring gear 19 through an output shaft 28a. Numeral 29 denotes a lock-up clutch for directly connecting the engine output shaft 1 with the turbine shaft 13.

The multiple transmission gear mechanism 10 as illustrated is provided with four shift gear stages for forward movement and one shift gear stage for reverse movement. The clutches 20, 21, 24 and 27 and brakes 23 and 25 are controlled to establish a desirable shaft gear stage among the plurality of the shift gear stages.

The table 1 shows operations of the respective clutches and brakes in the respective shift gear stages of the transmission.

TABLE 1

| REFERENCE | CLUTCH | | | | BRAKE | | ONE-WAY CLUTCH | |
|---|---|---|---|---|---|---|---|---|
| | 24 | 20 | 21 | 27 | 25 | 23 | 26 | 22 |
| P | | | | | | | | |
| R | ○ | | | | ○ | | | |
| N | | | | | | | | |
| D RANGE | | | | | | | | |
| 1 | | ○ | | | | | (○) | (○) |
| 2 | | ○ | | | | ○ | | (○) |
| 3 | | ○ | ○ | ○ | | | | (○) |
| 4 | | ○ | | ○ | | (○) | | |
| 2 RANGE | | | | | | | | |
| 1 | | ○ | | | | | (○) | (○) |
| 2 | | ○ | | | | ○ | | (○) |
| 3 | | ○ | ○ | | | | | (○) |
| 1 RANGE | | | | | | | | |
| 1 | | ○ | ○ | | ○ | | | (○) |
| 2 | | ○ | ○ | | | ○. | | (○) |

In the table 1, reference ○ means that the corresponding element is under operation for transmitting a torque but the corresponding element to reference (○) is effected to transmit the power only when it functions as a driving element.

Hereinafter, the hydraulic circuit 30 will be explained in connection with operations of the above frictional elements taking reference to FIG. 3.

Figure 3:
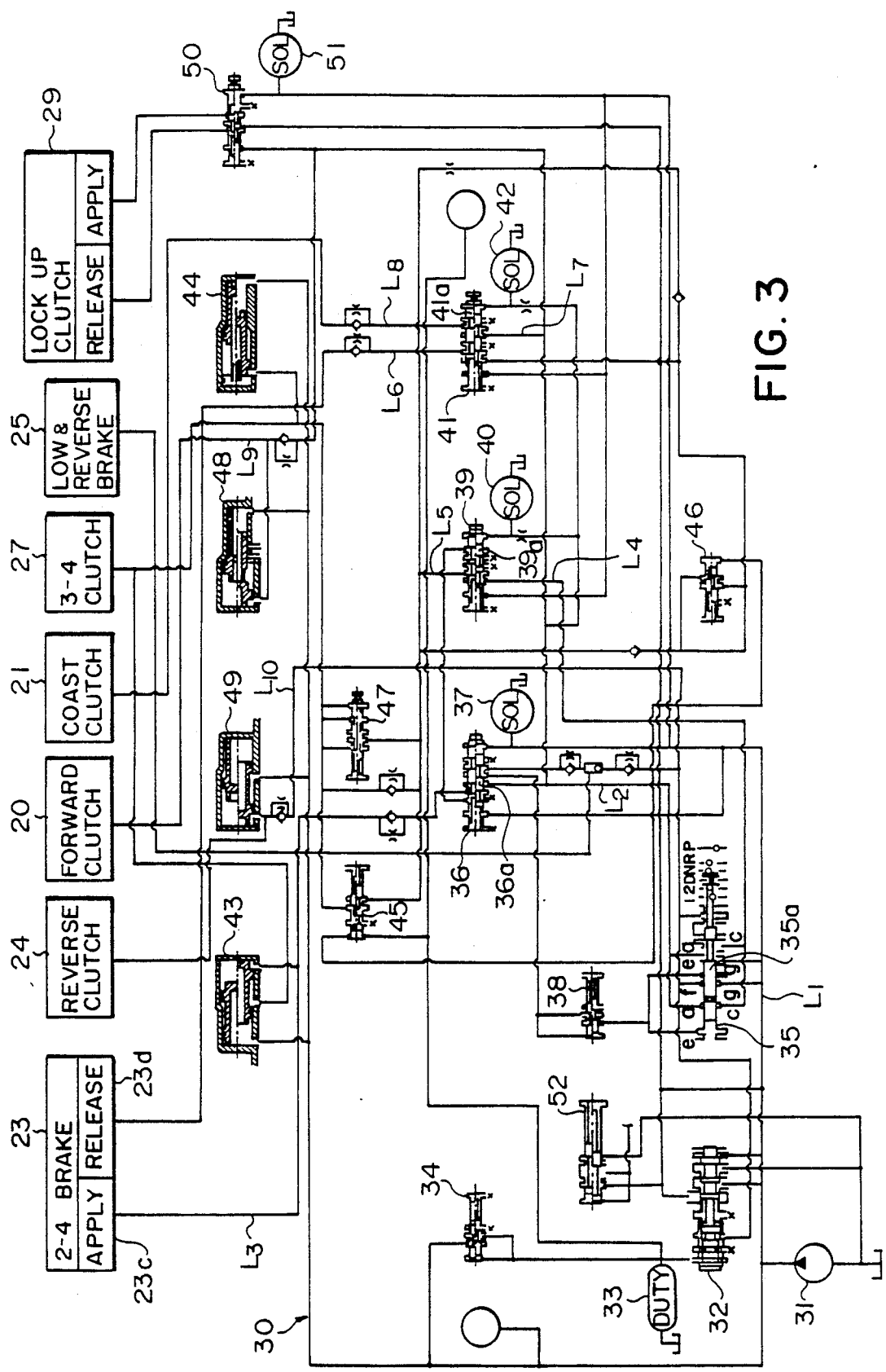
FIG. 3 is a systematic view of a hydraulic control circuit for the automatic transmission.

As shown in FIG. 3, the oil pump 31 discharges a hydraulic fluid to the hydraulic passage L1. The hydraulic pressure of the fluid is introduced into the pressure regulating valve 32. The pressure regulating valve 32 is controlled by the duty solenoid valve 33 to adjust the line pressure of the hydraulic control circuit 30. In detail, the hydraulic pressure from the pump 31 is reduced in a reducing valve 34 to a predetermined value. Thereafter, the hydraulic pressure is adjusted by virtue of a duty control of the solenoid valve 33 by controlling an amount of drain and introduced into the pressure regulating valve 32 as a pilot pressure therefor. Thus, the line pressure control of the hydraulic control circuit 30 is established. The regulated line pressure is introduced into a port g of a manual shift valve 35. The manual shift valve 35 is provided with a spool 35a connected with a select lever and associated with the lever so that the spool 35a can be moved in accordance with a manual operation for the select lever by a driver to a range D in which the gear shift operation is automatically made among the four forward gear stages, a range 2 in which the gear shift operation is automatically made among the first through a third gear stages of the transmission, a range 1 in which the gear shift operation is automatically made between the first and second gear stages and a reverse range R, a parking range P and a neutral range N.

The port g is communicated with ports a and e which set at the range 1, with ports a and c when set in the range 2 and D, and with a port f when set at the reverse range R.

The port a of the manual shift valve 35 is connected with a 1-2 shift valve 36 through the hydraulic line L2. The 1-2 shift valve 36 is subjected to a pilot pressure which is adapted to be controlled by a 1-2 solenoid valve 37. When the shift stage is the first stage, the 1-2 solenoid valve 37 is turned off so that a spool 36a thereof is moved toward the left end to connect a hydraulic passage L3 communicated with an apply chamber 23c of the 2-4 brake 23 to a draining port. When the shift stage is the second to fourth stages, the 1-2 solenoid valve 37 is turned on so that the spool 36a is moved toward the right end in the drawing. As a result, the hydraulic pressure is introduced from the port a into the apply chamber 23c of the 2-4 brake 23. When the shift stage is the first stage in the range 1, the 1-2 shift valve 35 introduces the hydraulic pressure supplied from the port e of the manual shift valve 35 through a low reducing valve 38 into the low & reverse brake 25. The hydraulic pressure from the port a of the manual shift valve 35 is introduced into the 2-3 shift valve 39 as a pilot pressure as well. The 2-3 shift valve 39 is connected with the port c of the manual valve 35 through a hydraulic passage L4. The pilot pressure therefor is controlled by a 2-3 solenoid valve 40. When in the first and second stages, the 2-3 solenoid valve 40 is turned on causing a spool 39a of the valve 40 to be moved rightward so that a hydraulic passage L5 communicated with the 3-4 clutch 27 is connected with a draining passage to release the 3-4 clutch 27.

The hydraulic passage L5 is also connected with a 3-4 shift valve 41 subjected to a pilot pressure controlled by a 3-4 solenoid valve 42. When the shift stage is the first, second and fourth stages in the range D, and the first in the range 2, the 3-4 solenoid valve 42 is turned on, causing a spool 41a of the valve 42 to be moved rightward so that a hydraulic passage L6 communicated with a release chamber 23d of the 2-4 brake 23 is connected with a draining passage.

When the shift stage is the third stage in the range D, second and third stages in the range 2 and the first and second stages in the range 1, the 3-4 solenoid valve 42 is turned off causing the spool 42a to be moved leftward so that the hydraulic passage L6 is connected with the passage L5 connected with the 2-3 shift valve 39. As a result, the introduction of the hydraulic pressure is controlled in accordance with the operation of the 2-3 shift valve 39.

The 3-4 shift valve 41 controls a communication between a hydraulic passage L7 connected with the port a of the manual shift valve 35 and a hydraulic passage L8 connected with the coast clutch 21 to thereby control the engagement and disengagement of the coast clutch 21. Thus, the operation of the 2-4 brake and 3-4 clutch 27 as frictional elements can be accomplished through the control of solenoid valves 37, 40 and 42 as shown in Table 1.

The control circuit 30 is provided with a 1-2 accumulator 43, a 2-3 accumulator 44, a 2-3 timing valve 45, a 3-2 timing valve 46 and 1 bypass valve 47 between the shift valves 36, 39 and 41 and the 2-4 brake 23 and the 3-4 clutch 27 for reducing a torque shock caused by switching operations thereof.

In addition, the control circuit 30 is provided with a N-D accumulator 48 connected with a hydraulic passage L9 which supplies the hydraulic pressure from the port a of the manual shift valve 35 so as to engage the forward clutch 20 in the first and second stages of the range D, a N-R accumulator connected with a hydraulic passage L10 which supplies the hydraulic pressure from the port f of the manual shift valve 35 so as to engage the reverse clutch 24 in the reverse range R, a lock-up control clutch 50 for controlling the lock-up valve 29, a lock-up solenoid valve 51 for controlling the lock-up control valve 50 and a converter relief valve 52.

Figure 4:
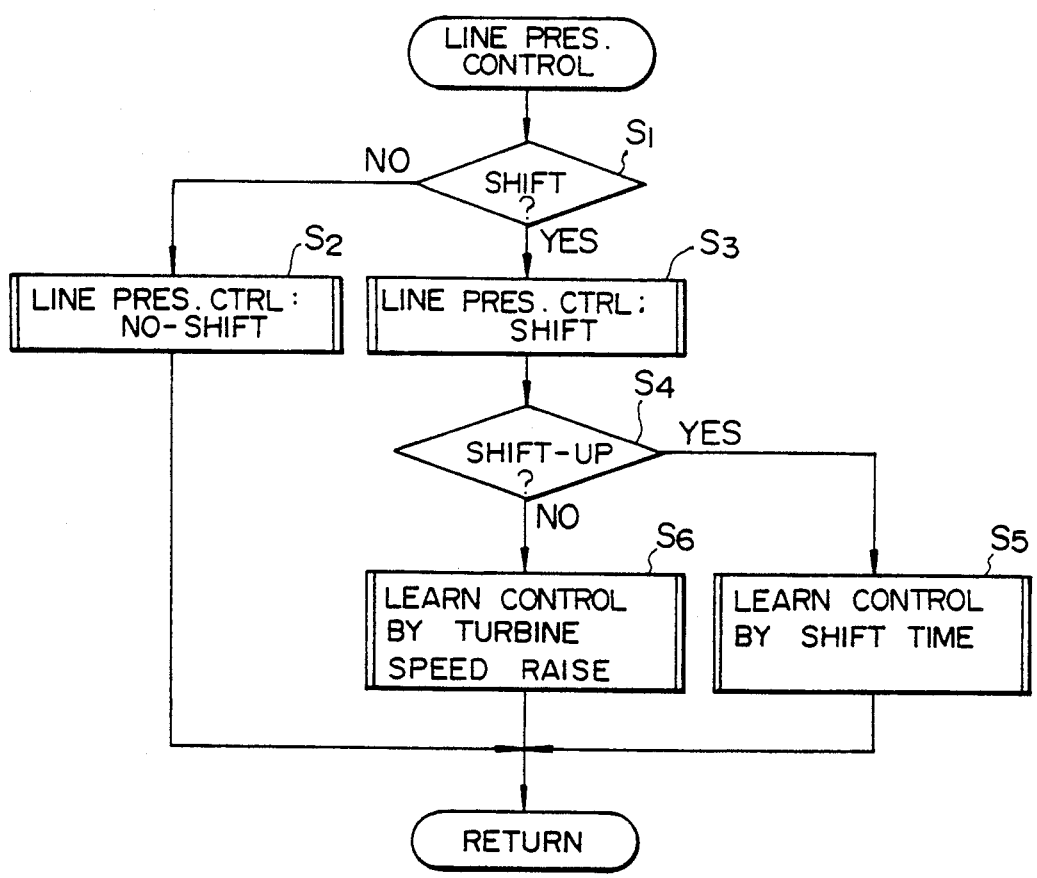
FIGS. 4 and 5 are flow charts of a line control in accordance with a preferred embodiment of the present invention.

Hereinafter, a line pressure control will be explained, taking reference to FIG. 4.

In controlling the line pressure, a judgement is made as to whether or not the vehicle is in a shift operation (step $S_1$). If the judgment is No, or when the vehicle is not in a shift operation, the line pressure is controlled in accordance with a throttle opening and turbine speed. If the judgment is Yes, a routine of FIG. 5 for controlling the line pressure during the shift operation is executed (step $S_3$), in which a judgment is made as to whether or not a vehicle is in a shift up operation (step $S_4$). If the judgement is Yes, the line pressure is controlled based on a learning control for a shift operation time period by carrying out a routine shown in FIG. 9 wherein the line pressure is controlled to such a target value that can provide a desirable shift operation time period. If the judgment in step $S_4$ is No or when the vehicle is in a down shift operation, the line pressure is compensated based on a turbine speed rise due to the shift operation or a difference between a target turbine speed at the end of the shift operation and an actual turbine speed detected.

Figure 5:
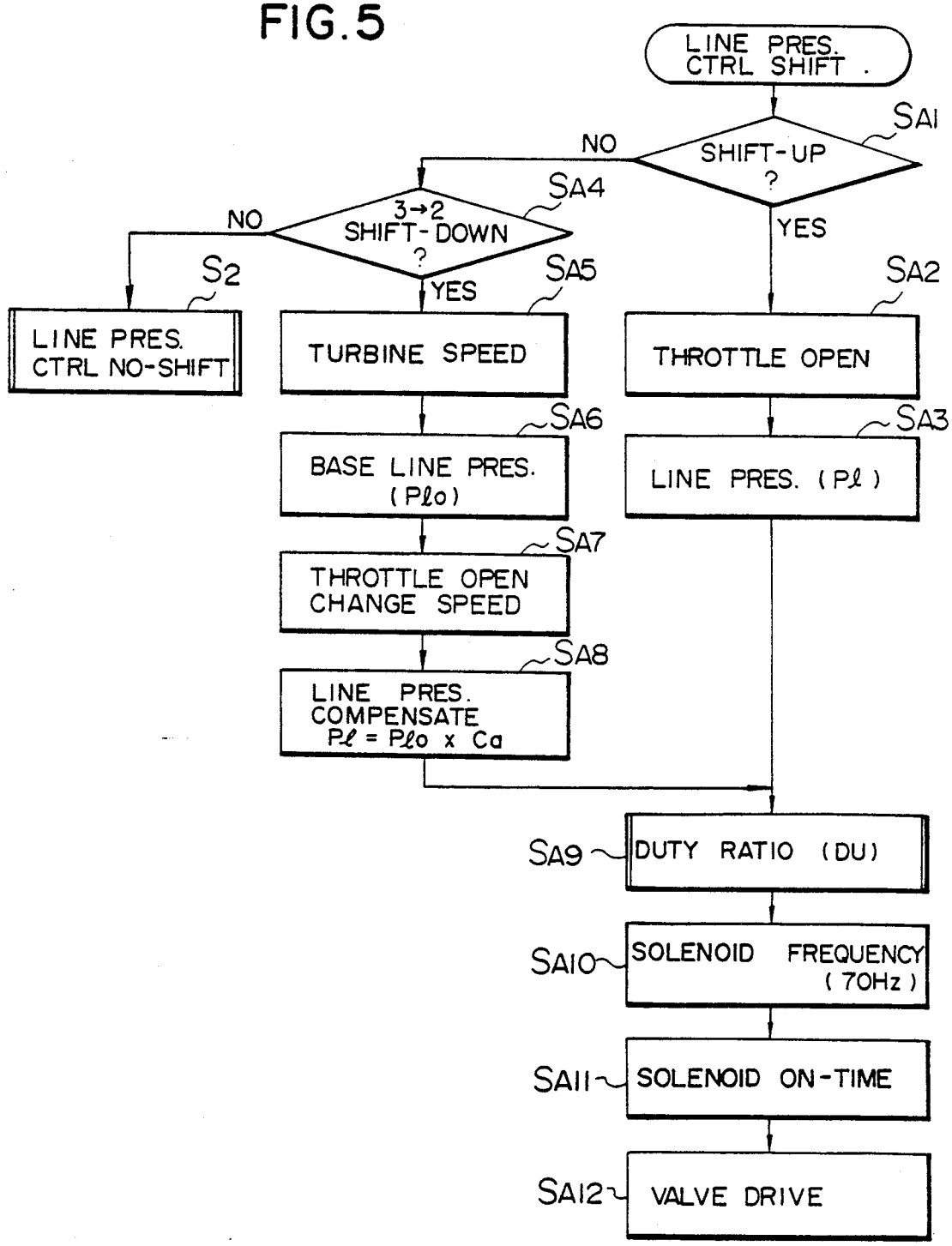
Figures 6A, 6B:
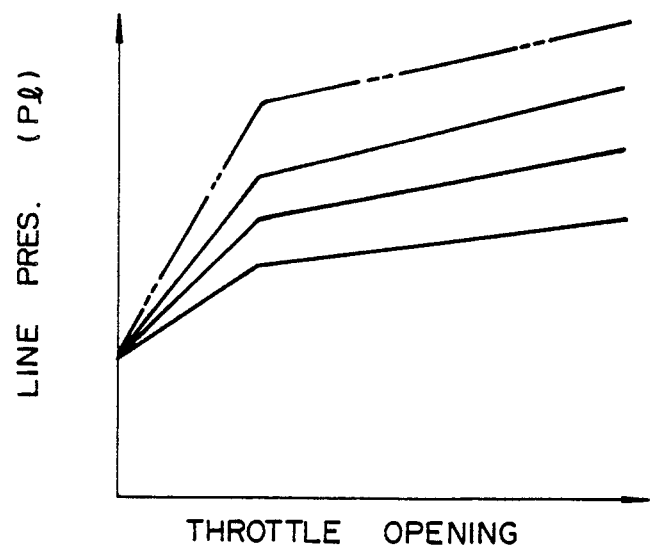
FIG. 6(a) is a view showing a map stored in a control unit for executing the line pressure control.
FIG. 6(b) is a graphical representation of the line pressure of the hydraulic control circuit for the automatic transmission.

Referring to FIG. 5, a judgment is made as to whether or not the vehicle is in the up-shift condition in step $S_{A1}$. When in the up-shift condition, the throttle opening is read and the line pressure P1 is determined based on shift stages involved in the shift operation and the throttle opening. This control effects to obviate the torque shock due to the shift operation. Since the torque shock due to the shift operation is concerned with engine output in response to the throttle opening and the gear stages, when the line pressure is decided irrespective of the gear stages involved in the shift operation, a proper control cannot be accomplished for any gear stage involved, although accumulators in the hydraulic circuit can be adjusted to obviate the torque shock. According to the illustrated embodiment, the line pressure under the up-shift condition is obtained in light of a map stored in a control unit as shown in FIG. 6(a) wherein the line pressure is provided in accordance with the gear stages involved in the shift operation and the throttle opening. In a conventional control, the line pressure takes a relatively high value for all gear stages involved as shown by a double-dot-dash line in FIG. 6(b) whereas the line pressure of the illustrated embodiment takes a relatively low value as shown by real lines in FIG. 6(b) and the line pressure is provided for each shift operation involving different gear stages.

If the judgment of step $S_{A1}$ is No, or when the vehicle is in a down shift condition, the control unit judges whether or not the down shift occurs from the third stage to the second stage (step $S_{A4}$). If the judgment is Yes, the line pressure is calculated through steps $S_{A5} \sim S_{A8}$). If the judgment is No, the line pressure control without shift operation is executed. When the downshift operation is made from the third stage to the second stage, the 3-4 clutch 27 goes off and the 2-4 brake 23 comes on. In this case, an engaging timing of the frictional element is necessary to be controlled for obviating the torque shock. In the case of down-shift operations other than the third to second stages, the 3-4 clutch or the 2-4 brake 23 is released so that the engaging timing of the frictional element is not necessary in terms of the line control.

Figures 7, 8:
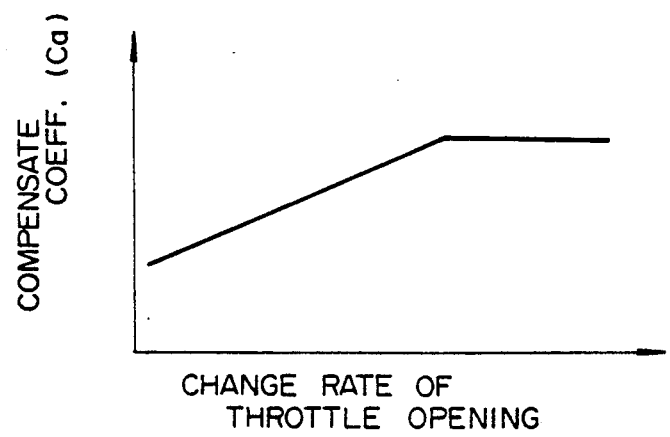
FIG. 7 is a view showing a map stored in the control unit for the line pressure control.
FIG. 8 is a graphical representation showing a compensating coefficient for the line pressure and a throttle opening change speed.

In controlling the line pressure when the down-shift operation is made from the third stage to the second stage, the turbine speed is read (step $S_{A5}$), a base line pressure $P1_0$ is determined in accordance with the turbine speed (step $S_{A6}$). Generally, the 2-4 brake is engaged when the turbine speed is settled to a proper value after the 3-4 clutch 27 is released. It should, however, be noted that the proper engaging timing depends on the turbine speed. In view of this, the base line pressure $P1_0$ is stored in a memory of the control unit in the form of a map as shown in FIG. 7 in accordance with the turbine speed. The base line pressure $P1_0$ is obtained through the map. In steps $S_{A7}$, $S_{A8}$, the line pressure is compensated based on the throttle opening change speed which is obtained from several values of the throttle opening detected. This is because the engine speed (turbine speed) is rapidly increased as the throttle opening change speed is increased. Therefore, it is necessary to advance the engaging timing of the frictional elements. For this purpose, compensating coefficient Ca is determined in accordance with the throttle opening change speed. The coefficient Ca is multiplied with the base line pressure $P1_0$ to obtain a final line pressure P1.

Thereafter, a duty ratio is determined for a duty solenoid valve SOS in step $S_{A9}$, a frequency of signal for driving the valve SOL is set in step $S_{A10}$, On-time period for the valve SOL is decided in step $S_{A11}$, and the valve SOL is actuated in step $S_{A12}$.

Figure 9:
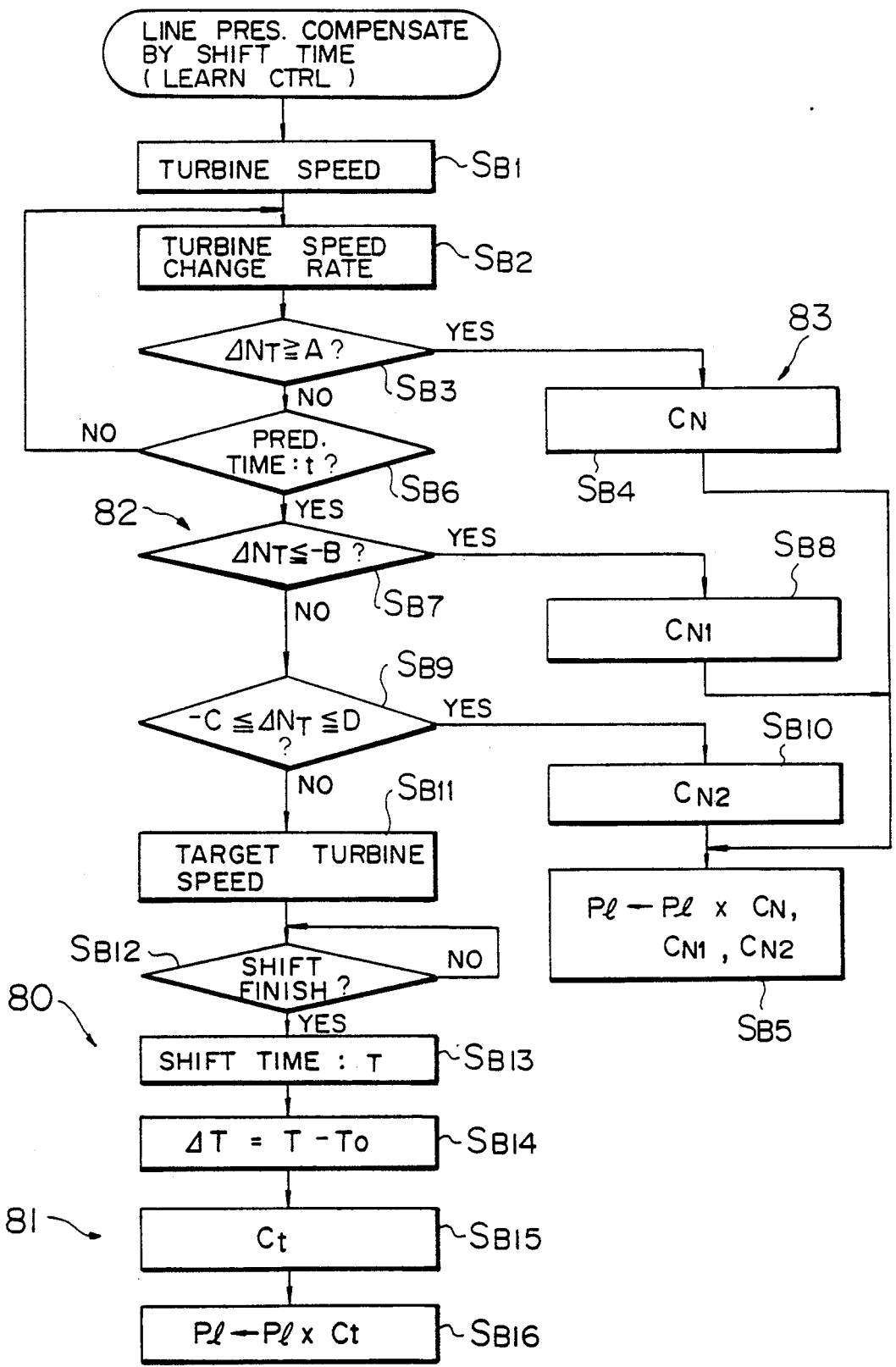
FIG. 9 is a view showing a flow chart of the line pressure control in accordance with the present invention.

Referring to FIG. 9, a line pressure compensation control will be explained.

This routine is executed for compensating the line pressure by means of the learning control. This routine is directed to compensate the line pressure P1 obtained in the step $S_{A3}$ of FIG. 5.

Figure 10:
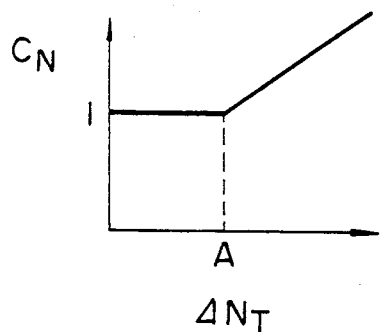
FIGS. 10 through 14 are graphical representations of various factors for compensating the line pressure.
Figure 11:
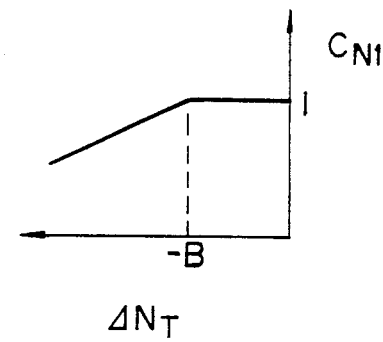
Figure 12:
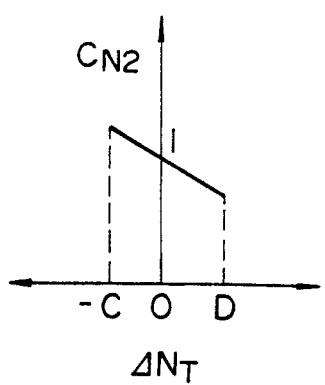

When the vehicle is in the up-shift condition, the turbine speed is gradually reduced as the frictional element is coming on or being engaged. In this case, the time period for the shift operation depends on the engaging speed of the frictional element. In view of this, the line pressure is compensated in accordance with the time period for the shift operation. For this purpose, the turbine speed is read in step $S_{B1}$. A change rate $\Delta N_T$ of the turbine speed is calculated in step $S_{B2}$. In step $S_{B3}$, the change rate $\Delta N_T$ is compared with a predetermined value A. When the change rate $\Delta N_T$ is not less than the value A, the control unit judges a raising of the turbine speed. In this case, a compensating coefficient $C_N$ is obtained through a map as shown in FIG. 10 in step $S_{B4}$. As the change rate $\Delta N_T$ is increased, the value $C_N$ is increased so that the base line pressure $Pl_0$ is increased. On the other hand, when the change rate $\Delta N_T$ is smaller than the value A in step $S_{B3}$, the control unit waits a predetermined time period t in order to find a turbine speed depression. When the time period t has passed, the change rate $\Delta N_T$ of the turbine speed is compared with a negative value -B in step $S_{B7}$. When the change rate $\Delta N_T$ is not greater than the value -B, the control unit judges a turbine speed depression. In this case, a compensating coefficient $C_{N1}$ is obtained through a map as shown in FIG. 11. As the change rate $\Delta N_T$ is decreased, the value $C_{N1}$ takes a smaller value to reduce the base line pressure $Pl_0$.

In step $S_{B7}$, when the change rate $\Delta N_T$ is larger than the value -B, the control unit judges whether or not the change rate $\Delta N_T$ is within a predetermined range ($-C \leq \Delta N_T \leq D$) in the vicinity of zero. If the judgment is Yes, the control unit judges a torque depression due to the shift operation. In this case, the compensating coefficient $C_{N2}$ is decreased as the change rate $\Delta N_T$ is increased within the range ($-C \leq \Delta N_T \leq D$) to reduce the base line pressure $Pl_0$ in step $S_{B5}$. If the judgment in step $S_{B9}$ is No, or when there is no turbine depression and no torque depression, the learning control for the line pressure is executed so as to accomplish a target value of the time period for the shift operation from steps $S_{B11}$.

In step $S_{B11}$, the target turbine speed after the shift operation is speculated based on the turbine speed before the shift operation. In step $S_{B12}$, the control unit compares the target turbine speed with an actual turbine speed detected. When a difference between the target turbine speed and the actual turbine speed is smaller than a predetermined value and the turbine speed change rate $\Delta N_T$ is smaller than a predetermined value, the control unit judges that the shift operation is completed. When the shift operation is completed, the control unit calculates the time period for the shift operation.

Figure 13:
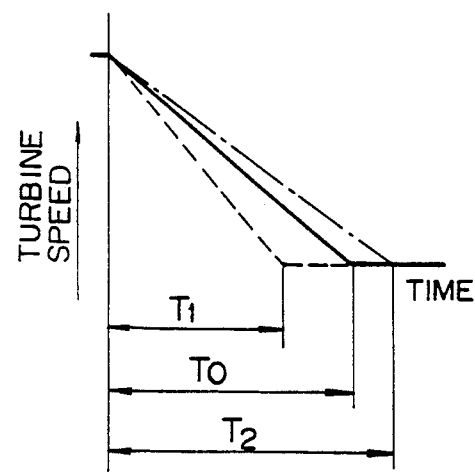
Figure 14:
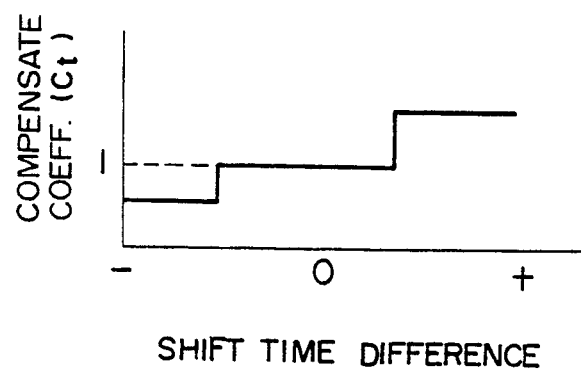

In step $S_{B14}$, the control unit calculates a difference $\Delta T$ between actual time period and target time period for the shift operation. In step $S_{B15}$, a compensating coefficient Ct is obtained through a map as shown in FIG. 14 in accordance with the difference $\Delta T$. When the difference $\Delta T$ is close to zero, the coefficient Ct is set at 1. When the actual time period of the shift operation as shown by $T_1$ is smaller than the target value or when the difference $\Delta T$ takes a negative value, the coefficient Ct is set at a value smaller than 1 so that the line pressure is decreased as shown in FIG. 13. When the actual time period of the shift operation as show by $T_2$ is greater than the target value or when the difference $\Delta T$ takes a positive value, the coefficient Ct is set at a value larger than 1 so that the line pressure is increased as shown in FIG. 13.

In step $S_{B16}$, the line pressure P1 is compensated by virtue of the coefficient Ct ($P1 = P1 \times Ct$).

Figure 15:
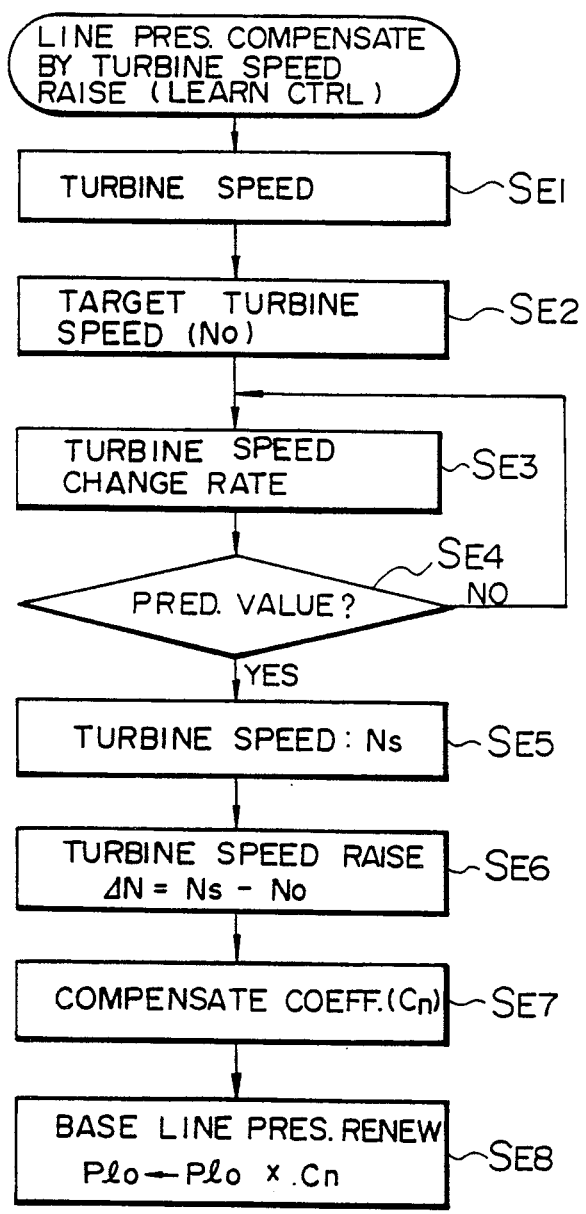
FIG. 15 is a view showing a flow chart of the line pressure compensating control.

Hereinafter, a compensation for the line pressure in the case of a turbine speed rise in step $S_4$ of FIG. 4 will be explained taking reference with FIG. 15.

In step $S_{E1}$, the turbine speed is read. In step $S_{E2}$, the control unit speculates a target turbine speed $N_o$ after the shift operation based on the turbine speed before the shift operation.

Figure 16:
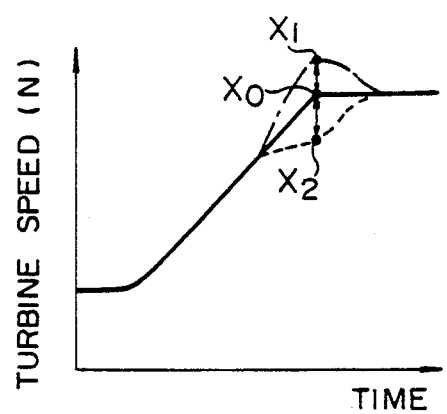
FIG. 16 is a graphical representation showing a turbine speed change.

In step $S_{E3}$, the turbine speed change rate is calculated. In step $S_{E4}$, the control unit judges whether or not the change rate is reduced below a predetermined value such as points $x_0, x_1, x_2$ in FIG. 16. When the turbine speed change rate is reduced below the predetermined value, the control unit judges that the shift operation is near the end. In this condition, the control unit detects the turbine speed $N_s$. In step $S_{E9}$, the control unit calculates the difference $\Delta N$ between the detected turbine speed $N_s$ and the target turbine speed $N_o$ as the turbine speed rise.

Figure 17:
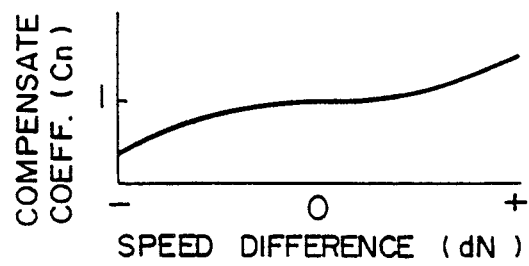
FIG. 17 is a graphical representation showing a compensating coefficient for the line pressure.

Thereafter, the control unit calculates the compensating coefficient Cn in light of a map shown in FIG. 17 based on the difference $\Delta N$ in step $S_{E7}$. As the difference $\Delta N$ takes a positive value and increases, the coefficient Cn is increased and takes a value greater than 1. As the difference $\Delta N$ takes a negative value and decreases, the coefficient Cn is decreased and takes a value smaller than 1. In step $S_{E8}$, the base line pressure is compensated by multiplying the coefficient Cn. The compensated line pressure P1 is employed for succeeding cycles. According to the above control, the turbine speed rise and depression can be prevented when the downshift operation occurs.

The procedures in the steps $S_{B12}$ and $S_{B13}$ in FIG. 9 constitute a shift time detecting device for detecting the time period for shift operation T or the time period from the start to the completion of the shift operation. The procedures in steps $S_{B14}$ through $S_{B16}$ constitute the first compensating means. The procedures in steps $S_{B1}$ through $S_{B3}$, $S_{B6}$, $S_{B7}$ and $S_{B9}$ constitute abnormality detecting means. The procedures in steps $S_{B4}$, $S_{B8}$ and $S_{B10}$ constitutes the second compensating means.

When the up-shift operation is executed between the second stage and the third stage, the 2-4 brake 24 is released or goes off and the 3-4 clutch is engaged or comes on to transmit the torque through the two frictional elements.

Figure 18:
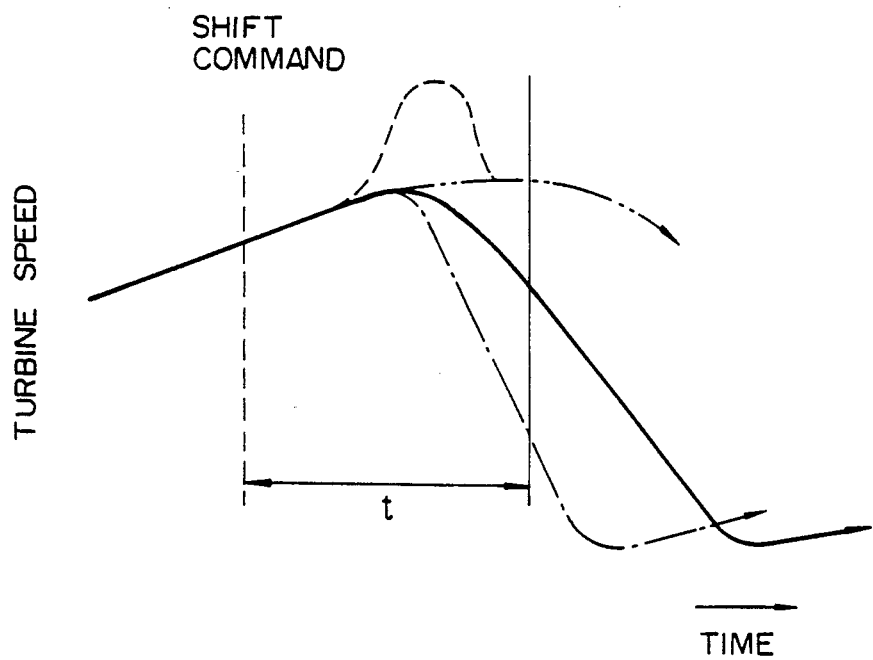
FIGS. 18 and 19 are graphical representations of turbine speed and torque capacity of the frictional elements involved in the shift operation.
Figure 19:
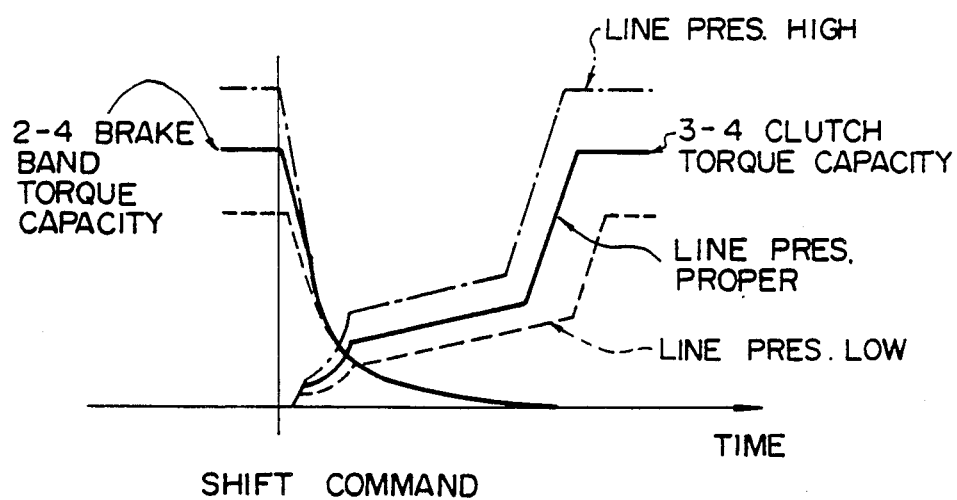

As shown by a broken line in FIG. 18, when the turbine speed rise occurs during the shift operation because the turbine speed change rate $\Delta N_T$ is not smaller than the predetermined value A, the compensating coefficient $C_N$ is set at a value greater than 1 and the line pressure P1 is compensated by multiplying the coefficient $C_N$ so that the line pressure P1 is increased. As a result, the torque capacity of the on-coming frictional element or 3-4 clutch 27 is increased in FIG. 19 to suppress the turbine speed rise in the succeeding shift operation.

To the contrary, when the turbine speed change rate $\Delta N_T$ is not greater than the negative value -B as shown by a dot-dash line in FIG. 18 and the turbine speed depression occurs, the compensating coefficient $C_{N1}$ is set at a value smaller than 1 so that the line pressure pl is decreased to suppress the turbine speed depression.

As shown by a double-dot-dash line in FIG. 18, when the turbine speed change rate $\Delta N_T$ is within the range ($-C \leq \Delta N_T \leq D$) and the torque depression occurs, the compensating coefficient $C_{N2}$ is set at a value smaller than 1 so that the line pressure P1 is reduced. As a result, 2-4 brake 23, which is the off-going frictional element, is quickly reduced in the torque capacity. Concurrently, the on-coming frictional element is slowly engaged. Thus, a locked condition can be avoided that both the off-going and on-coming frictional elements are strongly engaged during the shift operation, consequently, the engine torque depression can be prevented during the shift operation.

Hereinafter, another embodiment of the invention is described.

Figure 20:
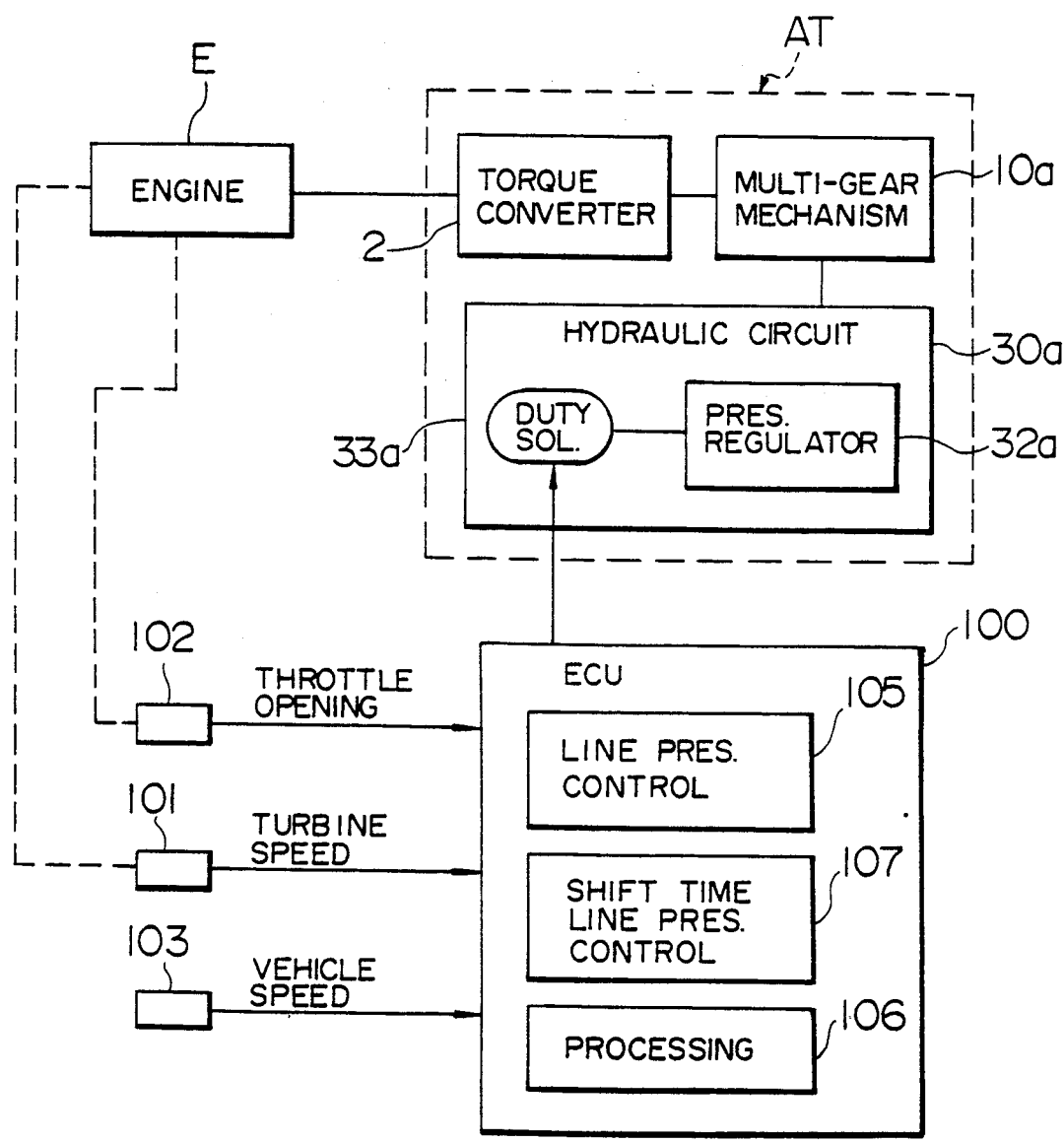
FIG. 20 is a block chart of the line pressure control system of the control circuit for the automatic transmission in accordance with another embodiment.

Referring to FIG. 20, the automatic transmission AT is provided with a torque converter 2 receiving the output torque from the engine E, a multiple stage transmission gear mechanism 10a, a hydraulic control circuit 30a. The transmission gear mechanism 10a is provided with a plurality of frictional elements, such as clutches and brakes for switching a power transmitting path therein. The engagement and disengagement of the frictional elements are controlled by the hydraulic control circuit 30. The hydraulic control circuit 30 is provided with a pressure regulating valve 32a for adjusting a line pressure introduced into the frictional elements and a duty solenoid valve 33 for controlling the regulating valve 32, which constitutes a line pressure control mechanism.

There is provided an electronic control unit (ECU) 100, preferably including a microcomputer, for controlling the hydraulic control circuit 30a. The control unit receives a signal from an input member speed detecting device for detecting an input member speed of the multiple stage transmission gear mechanism 10a, such as a turbine speed sensor 101 which detects the turbine speed of the torque conveter 2a, a throttle sensor 102 and a vehicle speed sensor 103 for detecting the vehicle speed.

The control unit 100 includes a line pressure control device 105 for controlling the duty solenoid valve 33a to thereby control the line pressure of the hydraulic control circuit 30a, and processing device 106 for calculating a speculative turbine speed based on the gear ratio and the vehicle speed before the shift operation to obtain the turbine speed raising based on the actual turbine speed from the turbine sensor 101, pressure control device 107 for controlling the line pressure based on the turbine speed raising so as to suppress the turbine speed rise. In addition, the control unit 100 controls solenoid valve 37, 40 and 42 to perform a shift control in accordance with an engine operating condition obtained through the throttle opening and the turbine speed or vehicle speed based on a predetermined shift pattern and also controls a lock-up solenoid valve 51 to thereby control a lock-up clutch 29 for establishing a lock-up condition.

Figure 21:
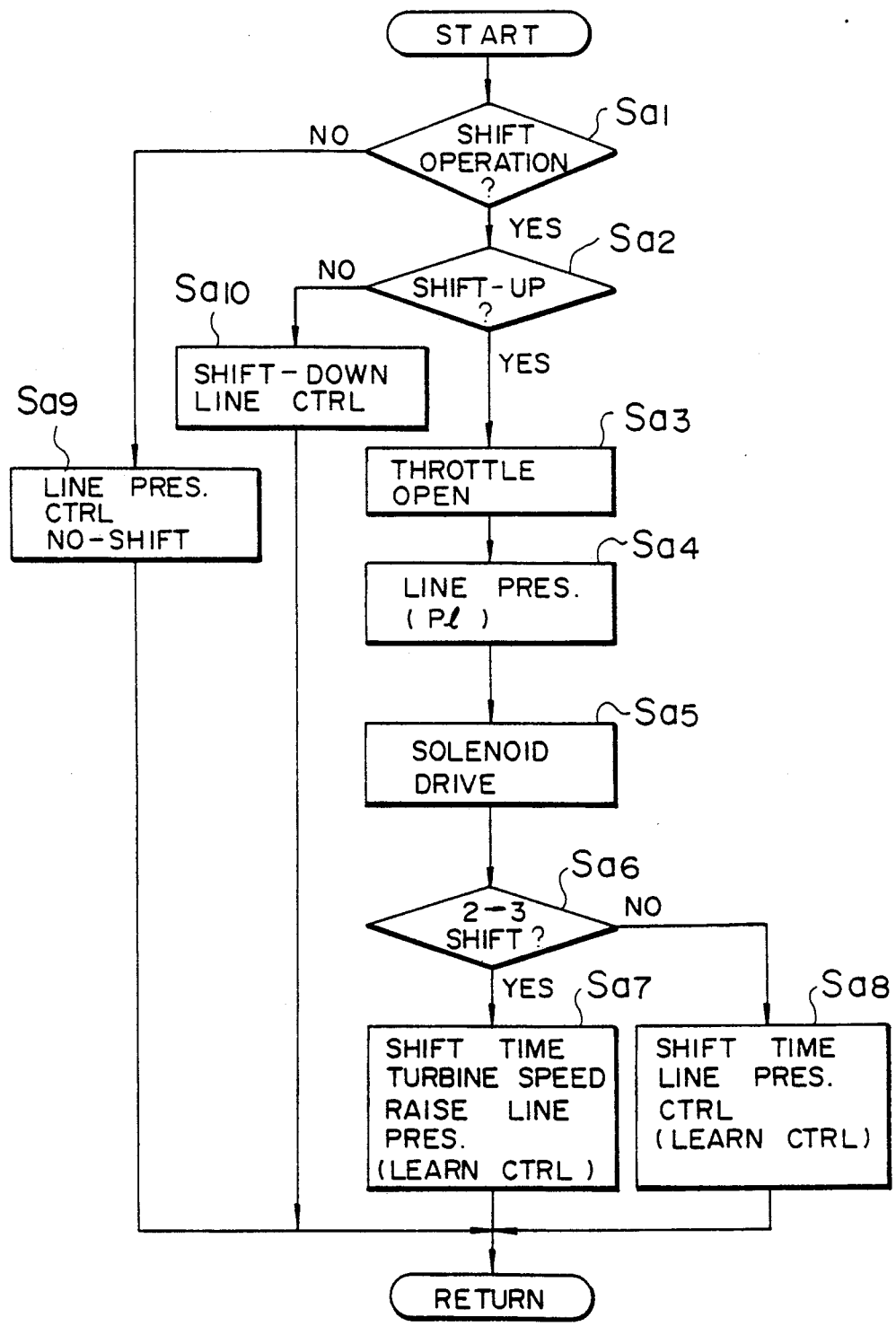
FIGS. 21 and 22 are views showing flow charts of the line pressure control in accordance with the embodiment of FIG. 20.
Figure 22:
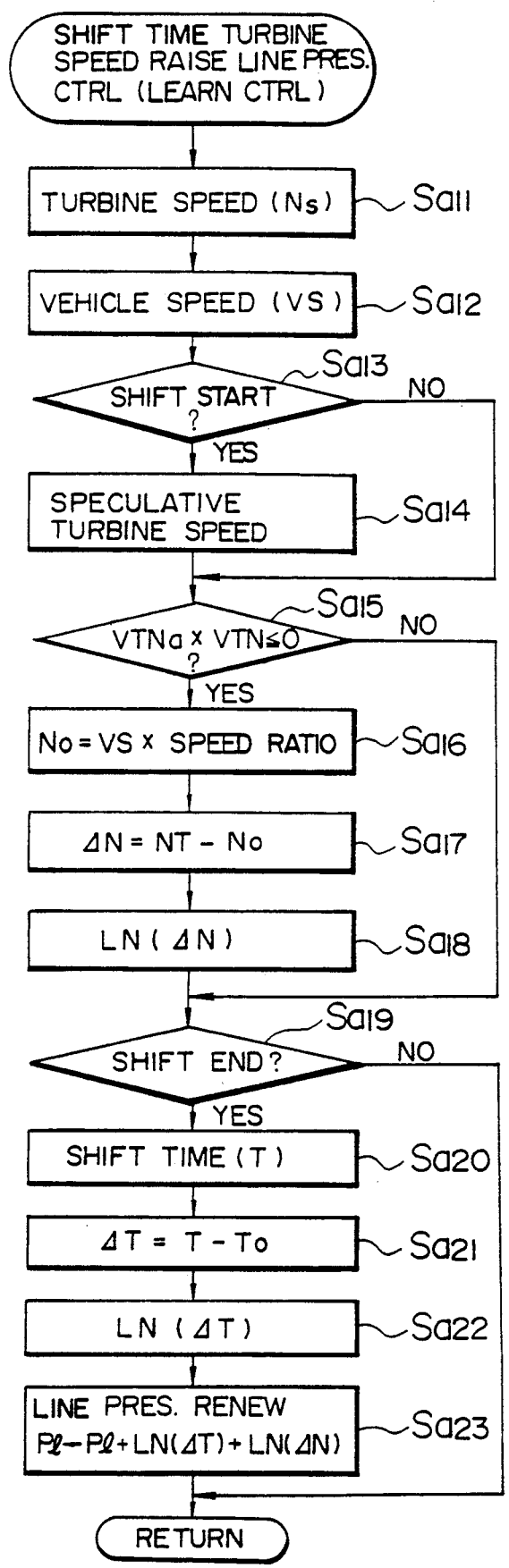

The control unit 100 executes the line pressure control for the hydraulic pressure 30a in accordance with a procedure shown in FIG. 21 and 22.

Referring to FIG. 21, the control unit 100 judges whether or not the vehicle is in the shift operation in step $S_{a1}$. If the judgment is Yes, the Control unit 100 judges whether or not the vehicle is in the up-shift condition in step $S_{a2}$.

When the vehicle is in the up-shift condition, the control unit 100 carries out the line pressure control in accordance with the throttle opening through step $S_{a3} \sim S_{a5}$. That is, the throttle opening is read in step $S_{a3}$ and the line pressure P1 is determined in accordance with the shift gear stage and throttle opening in step $S_{a4}$. Thereafter, the control unit 100 obtains a duty ratio which provides the line pressure P1 and produces the duty signal for the duty solenoid valve 33 in step $S_{a5}$.

The control unit 100 is provided with a map providing the line pressure after up-shift operation in accordance with the shift gear stage involved. Thus, if the shift gear stages involved in the shift operation is changed, the line pressure obtained through the map are changed.

The line pressure P1 after the up-shift operation is renewed by means of the learning control with regard to the time period for the shift operation. In the initial stage of the shift operation, a learning system is established for the turbine speed raising with regard to the specific up-shift operation. In the up-shift operation from second to third gear stages, the learning control is executed with regard to the turbine speed rise in addition to the time period for the shift operation. For this purpose, the control unit 100 judges whether or not the vehicle is in the up-shift operation from the second to third stages in step $S_{a6}$. If the judgment is Yes, the control unit 100 carries out the procedure for learning the line pressure based on the time period of the shift operation and the turbine speed rise during the shift operation as shown in FIG. 22.

In an up-shift operation other than the up-shift operation from second to third gear stages, the control unit 100 executes the learning control with regard to the time period for the shift operation wherein the line pressure is controlled based on a difference between the actual shift operation detected and a target value of the shift operation. In other words, the line pressure is modified to accomplish the target time period for the shift operation in step $S_{a8}$.

When the judgment is No in step $S_{a1}$, or when the vehicle is not in the shift operation, the control unit 100 executes the line pressure control without shift operation in step $S_{a9}$. When the judgment is No in step $S_{a2}$, or when the vehicle is in the downshift operation, the control unit 100 executes the line pressure control for the down-shift operation in step $S_{a10}$. For example, the control unit 100 obtains a duty ratio from a map providing the line pressure based on the turbine speed and the throttle opening to operate the duty solenoid valve 33 in such a manner that the line pressure can be obtained.

FIG. 22 shows the procedure for learning the line pressure based on the turbine speed rise and the time period for the shift operation during the shift operation from the second to third stages. The learning control in FIG. 22 includes the procedure by the processing device 106 and the pressure control device 107.

Figures 23, 24:
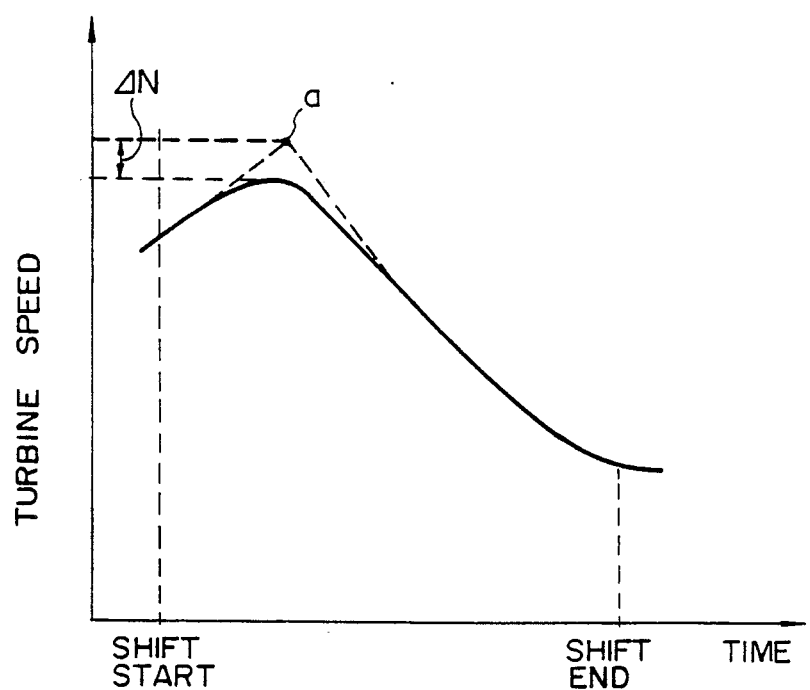
FIG. 23 is a view showing a map of a compensating value.
FIG. 24 is a graphical representation showing a turbine speed change.

According to the procedure in FIG. 22, the turbine speed NS and the vehicle speed VS are read in step $S_{a11}$, $S_{12}$. The control unit 10 calculates a speculative turbine speed after the shift operation based on the turbine speed before the shift operation in step $S_{a13}$, $S_{a14}$. Next, the turbine speed change amount VTN in small period of time is calculated. Thereafter, the control unit 100 multiplies the turbine speed change amount VNTa of the preceding cycle into the turbine speed change amount VNT of the present cycle in step $S_{a15}$. If the resultant value is negative, it is found that the turbine speed had a peak value in the last processing cycle. This means that the turbine speed changes in a manner of taking a peak value as the shift operation is progressed. When the turbine speed takes the maximum value, the speculative turbine speed $N_o$ is calculated by multiplying the vehicle speed VS into the gear ratio (in this particular embodiment, the gear ratio of second stage) in step $S_{a17}$. The control unit 100 obtains the turbine speed difference or rise $\Delta N$ based on the turbine speed NT detected through the turbine speed sensor and a speculative value or the targed value $N_o$ and finds modification value LN of the line pressure in response to the turbine speed raising $\Delta N$ in step $S_{a18}$. The value of the modification LN($\Delta N$) is increased as the turbine speed rise $\Delta N$ is increased as shown in FIG. 23. The value of the modification LN($\Delta N$) is stored in the map in the control unit 100.

In step $S_{a19}$, the control unit 100 judges whether or not the difference between the turbine speed $N_s$ and the speculative turbine speed $N_o$ obtained in step $S_{a14}$ is smaller than a predetermined value and the turbine speed change rate is smaller than a predetermined value. If the judgment is Yes, the control unit 100 judges the completion of the shift operation.

If the shift operation is completed, the control unit obtains the time period for the shift operation in step $S_{a20}$. Thereafter, the control unit 100 calculates the time difference $\Delta T$ between the time period T obtained in the step $S_{a20}$ and a target shift operation time period $T_o$. The control unit 100 finds a modification value $LN(\Delta T)$ based on the difference $\Delta T$ in light of a map. When the difference $\Delta T$ is within a predetermined range, the modification value $LN(\Delta T)$ is zero. When the difference $\Delta T$ takes a positive value beyond the predetermined range, the modification value $LN(\Delta T)$ takes a positive value in response to the difference $\Delta T$. When the difference $\Delta T$ takes a negative value beyond the predetermined range, the modification value $LN(\Delta T)$ takes a negative value in response to the difference $\Delta T$. In step $S_{a23}$, the control unit 100 modifies and renews the line pressure P1 in the case of the shift operation from the second to third stages based on the modification values $LN(\Delta N)$, $LN(\Delta T)$ as follows:

$$P1 = P1 + LN(\Delta N) + LN(\Delta T)$$

This can be defined as the learning control of the line pressure for the 2-3 up-shift operation. Thereafter, the renewed or learned line pressure is employed for the shift operation.

In the case of the up-shift operation from the second to the third stages, as shown in FIG. 24, the turbine speed changes in a manner of taking a peak value a little bit after the start of the shift operation, then reducing toward the turbine speed of the third stage. When there is no turbine speed rise and a proper shift operation is being made, the turbine speed changes as shown by a real line. Under such proper shift operation, the speculative value $N_o$ can be obtained based on the vehicle speed VS and the gear ratio.

On a other hand, if there occurs the turbine speed rise as shown by a dash line in FIG. 24 in an initial stage of the shift operation, the difference between the actual turbine speed at a point a of the peak value and the speculative value $N_o$ is calculated so that the amount of the turbine speed raising $\Delta N$ can be accurately obtained. In this case, the line pressure is modified to be increased by virtue of the modification value $LN(\Delta N)$ to suppress the turbine speed rise. As aforementioned, according to the illustrated embodiment, the line pressure is controlled based on the learning control in accordance with the time period T for the shift operation as well as the turbine speed rise $\Delta N$ so that the time period for the shift operation can be converged within the predetermined range and the turbine speed rise can be suppressed.

Hereinafter, still another embodiment of the present invention is described taking reference to FIG. 25.

Figure 25:
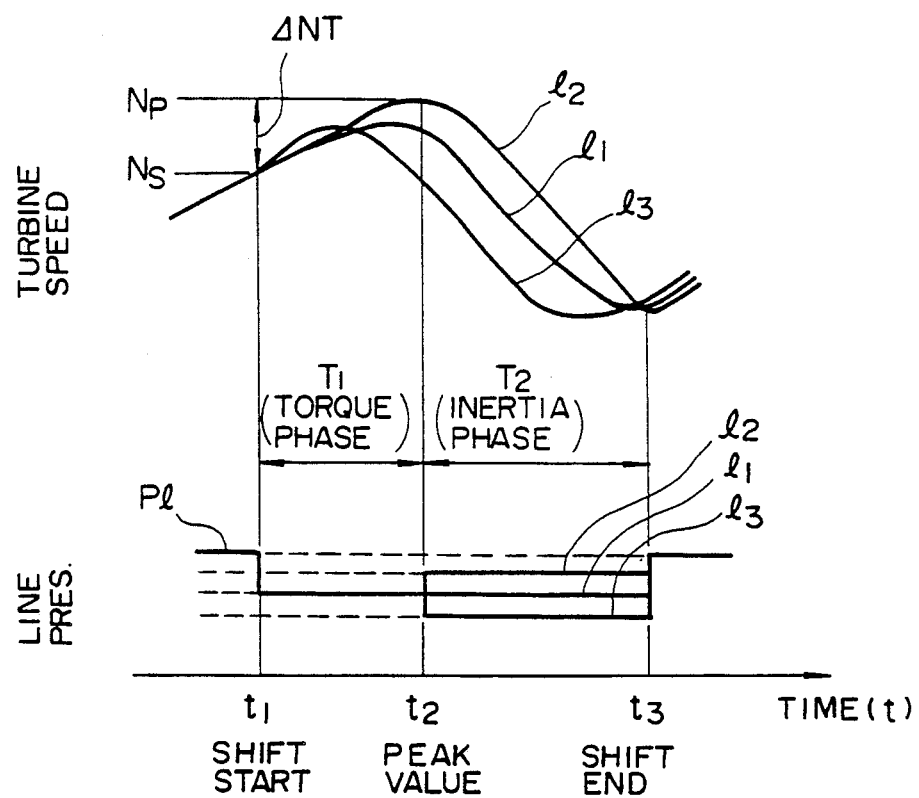
FIG. 25 is a graphical representation showing a line pressure control in accordance with still another embodiment of the present invention.

In FIG. 25, there is shown a relationship between the turbine speed and the line pressure.

The shift operation is started at the time $t_1$ with the turbine speed $N_s$. The line pressure is changed from the value P10 to P11. The turbine speed has a peak value $N_p$ at the time $t_2$ in the shift operation. The line pressure P1 is compensated based on the turbine speed change amount $\Delta NT = (N_s - N_p)$ during the time period between the time $t_1$ and $t_2$ which defines the torque phase period $T_1$.

The shift operation finishes at a time $t_3$ when the turbine speed takes a substantially minimum value. The time period between the time $t_2$, and $t_3$ defines the inertia phase period $T_2$. When the turbine speed curve is shown as a line 11 in light of the torque phase period and the turbine speed change amount $\Delta NT$, the line pressure is proper, thus it is maintained at the same value in the inertia period $T_2$ as the torque period $T_1$. When the turbine speed curve is shown as a line 12, in which there occurs a turbine speed rise, it is considered that the frictional elements involved in the shift operation is slowly engaged. In this case, the line pressure is increased from the value P11 to P12 to suppress the turbine speed rise in the inertia phase $T_2$. On the other hand, when the turbine speed curve is shown as a line 13 in which there occurs the turbine speed depression, it is considered that the engagement of the frictional elements is too abrupt. Thus, in this case, the line pressure is reduced from the value P11 to P13.

Figure 26:
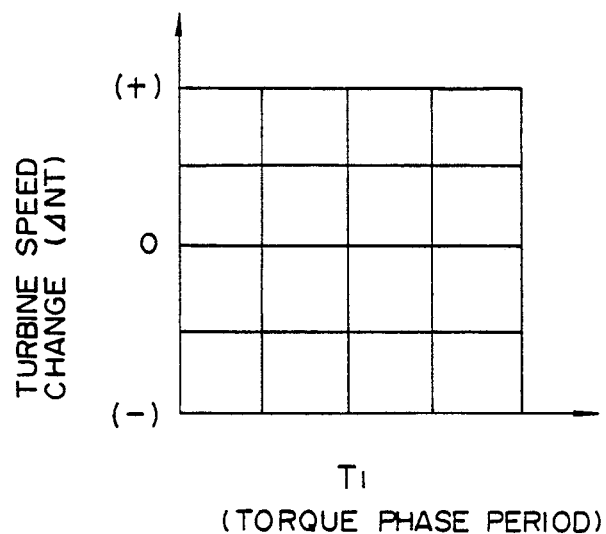
FIGS. 26 through 28 are views providing compensating factors for the line pressure control in FIG. 25.
Figure 27:
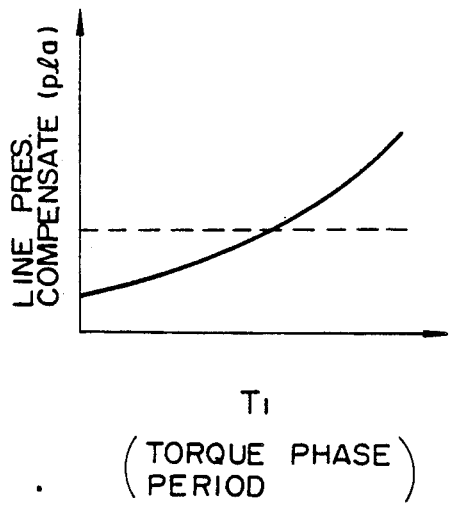
Figure 28:
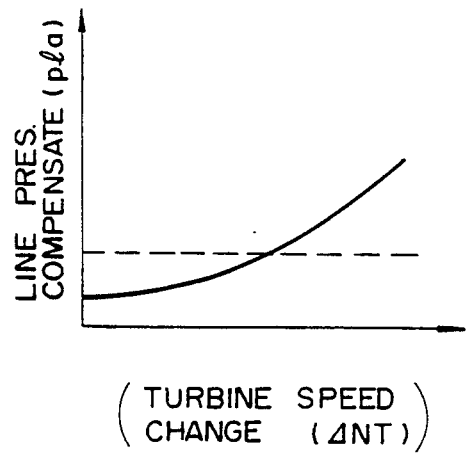

The compensating value P1a is obtained through a map as shown in FIG. 26 based on the torque phase period $T_1$ and the turbine speed change amount $\Delta NT$. The obtained compensating value P1a is increased as the torque phase $T_1$ is increased as shown in FIG. 27. The compensating value P1a is increased as the turbine speed change amount $\Delta NT$ is increased.

Figure 29:
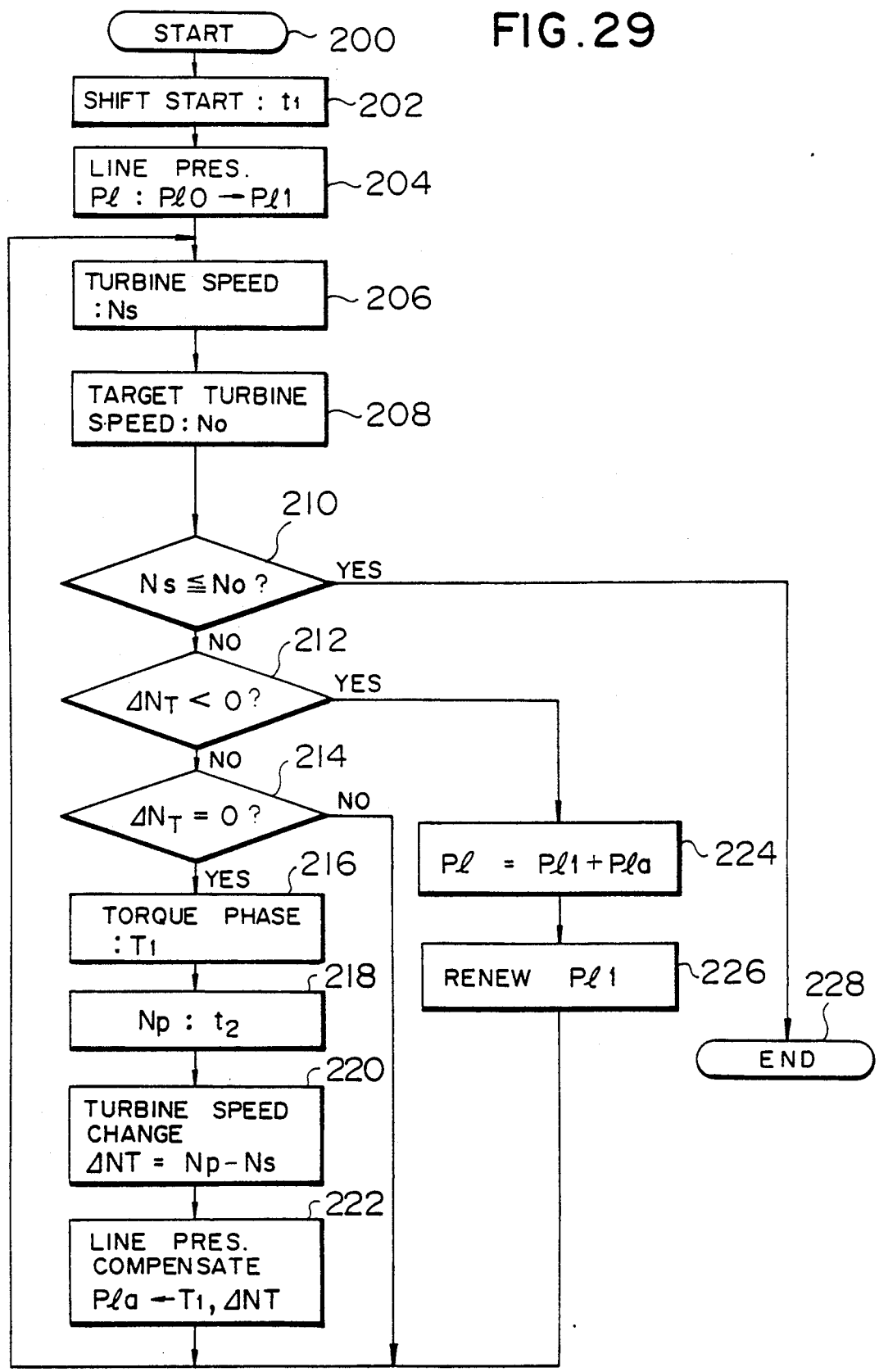
FIG. 29 is a view showing a flow chart in accordance with the embodiment of FIG. 25.

Referring to FIG. 29, the shift operation is started at the time $t_1$ in step 202. In step 204, the line pressure P1 is changed from a value P10 to P11. In step 206, the control unit 100 reads the actual turbine speed $N_s$, and obtains the target turbine speed $N_o$ at the end $t_3$ of the shift operation based on the turbine speed at the start $t_1$ of the shift operation and the gear ratio.

In step 210, the control unit 100 judges whether or not the turbine speed $N_s$ is not greater than the target speed $N_o$. When the judgment is No, or when the turbine speed $N_s$ is greater than the target value $N_o$, the control unit 100 executes procedure in step 212 in which the differential value of the turbine speed $N_s$ is calculated and judges as to whether or not the differential value is negative. If the judgment is No, the procedure goes to step 214. If the judgment of the step 212 is Yes, or when the differential value turbine speed change rate $\Delta N_T$, has a positive value, the procedure in step 206 is executed. When the value $\Delta N_T$ is zero, or when the turbine speed is substantially constant, step 216 is carried out, in which the torque phase period $T_1$ is obtained. In step 218, the turbine speed at the time $t_2$ is obtained. In step 220, the turbine speed change amount $\Delta NT = N_P - N_S$ is obtained. In step 222, the compensating value P1a is obtained through a map shown in FIG. 26 based on both the torque phase period $T_1$ and the turbine speed change amount $\Delta NT$.

When the value $\Delta N_T$ is zero, the actual turbine speed is reduced. In step 224, the control unit 100 changes the line pressure P1 from the value P11 to a value P11 + P1a for the inertia phase period. When the turbine speed $N_s$ is not greater than the target value $N_o$, it is considered that the actual turbine speed accomplishes the target value $N_o$.

Figure 30:
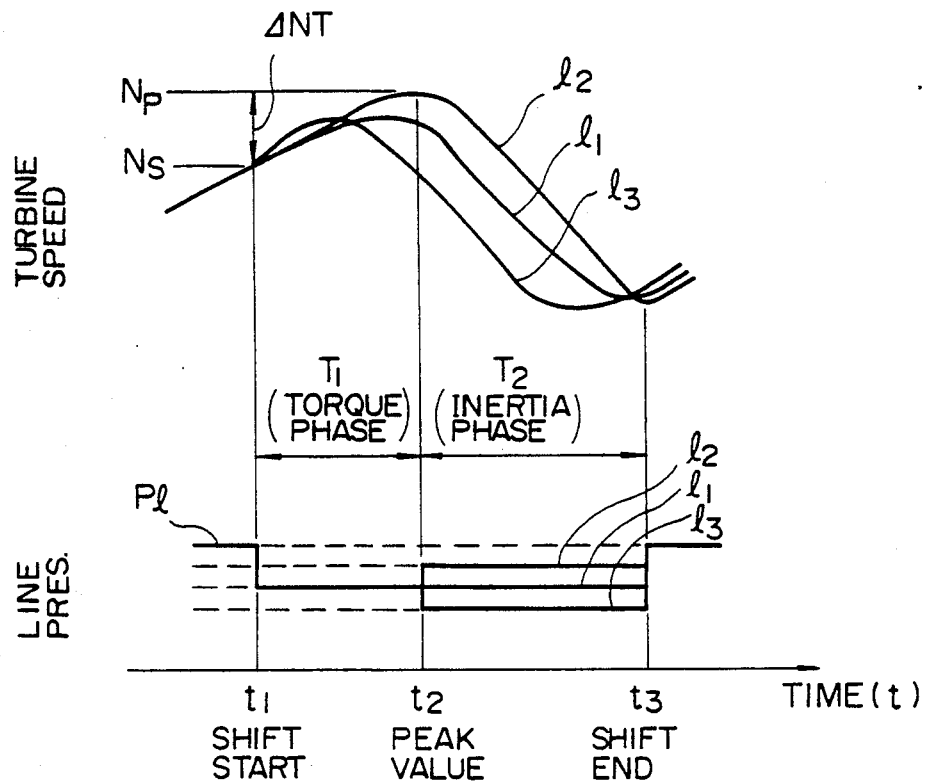
FIG. 30 a graphical representation showing a line pressure control in accordance with further embodiment of the present invention.
Figure 31:
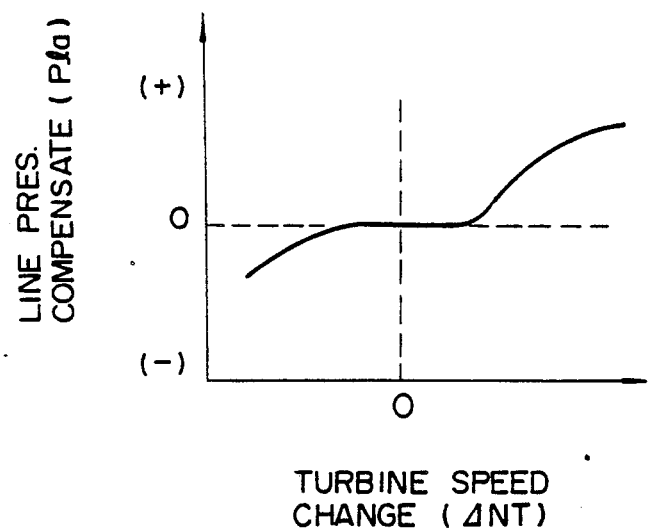
FIG. 31 is a view providing compensating coefficient for the line pressure control in FIG. 30.
Figure 32:
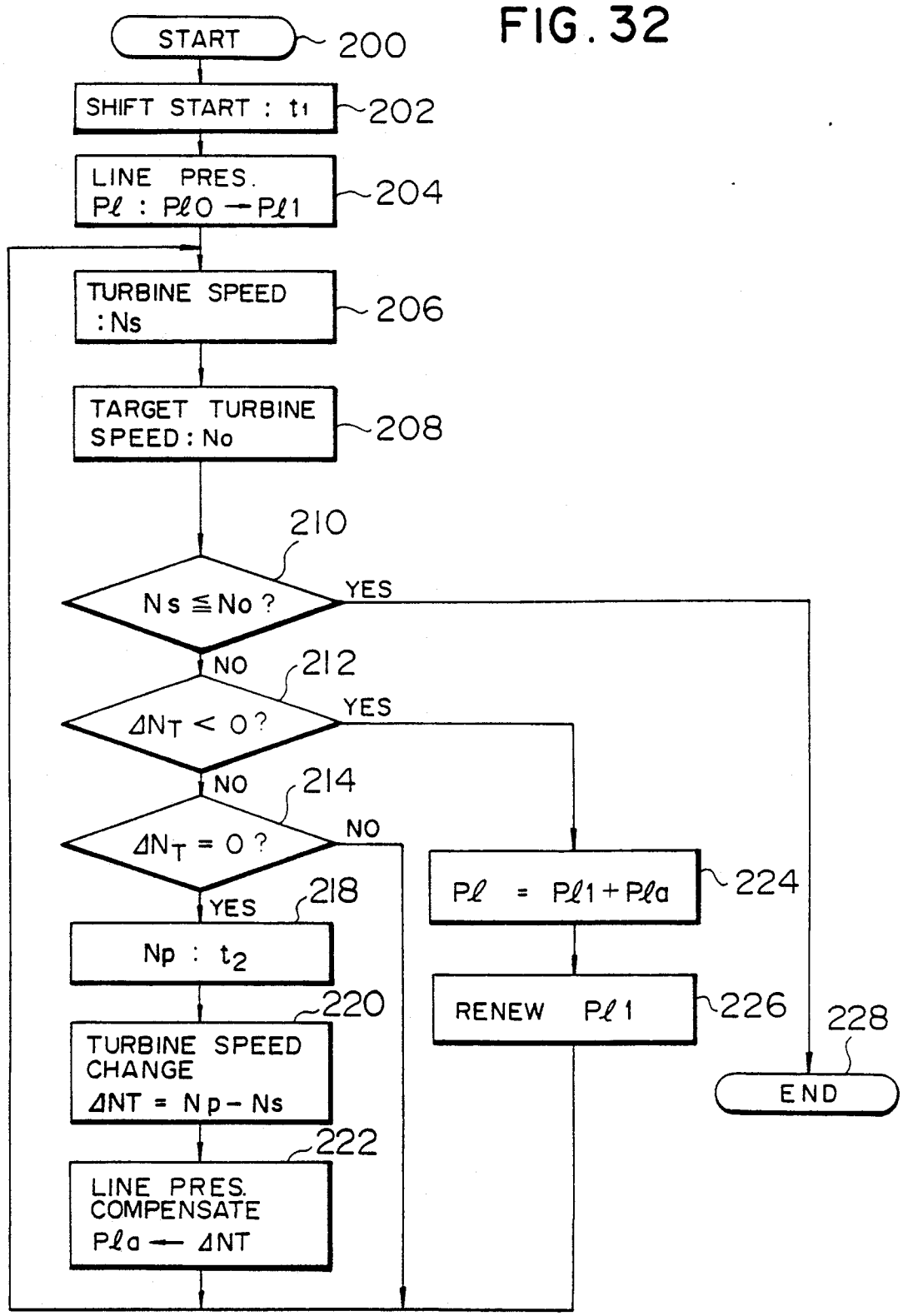
FIG. 32 is a view showing a flow chart in accordance with the embodiment of FIG. 30.

Referring to FIGS. 30, 31 and 32, still another embodiment is described. Referring to FIG. 30, there is shown a relationship between the turbine speed and the line pressure. In this illustrated embodiment, the compensating value P1a is obtained through a graph shown in FIG. 31 based on the turbine speed change amount ΔNT in step 222 of a flow chart in FIG. 32.

Figure 33:
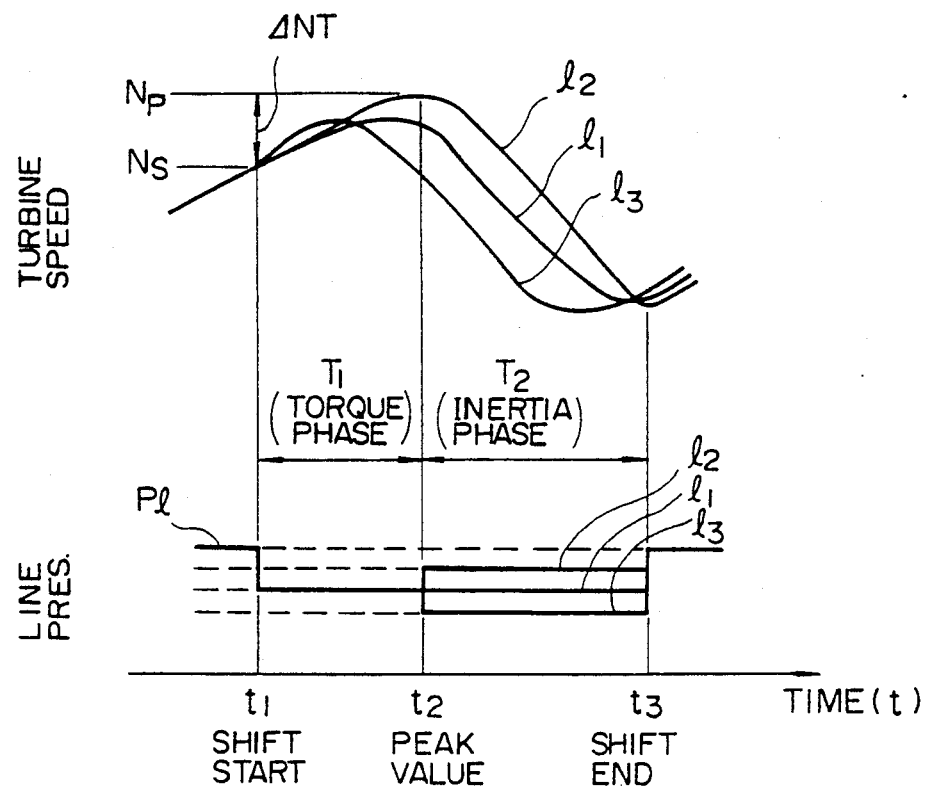
FIG. 33 is a graphical representation showing a line pressure control in accordance with still further embodiment of the present invention.
Figure 34:
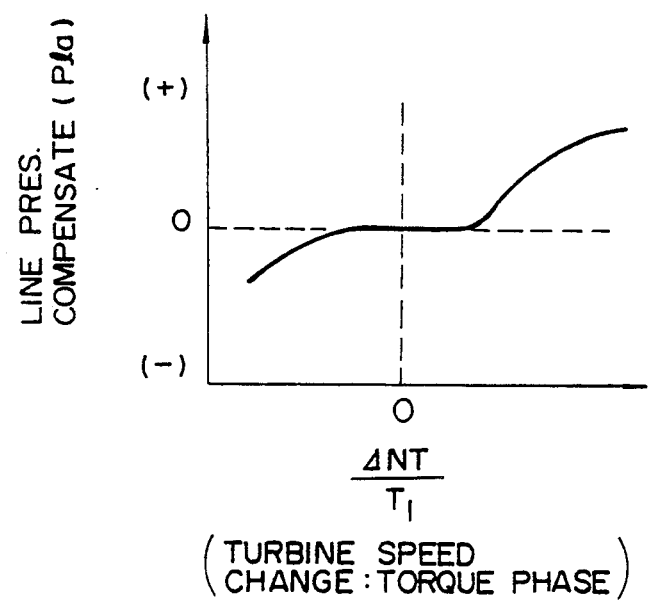
FIGS. 34 is a view providing compensating coefficient for the line pressure control in FIG. 33.
Figure 35:
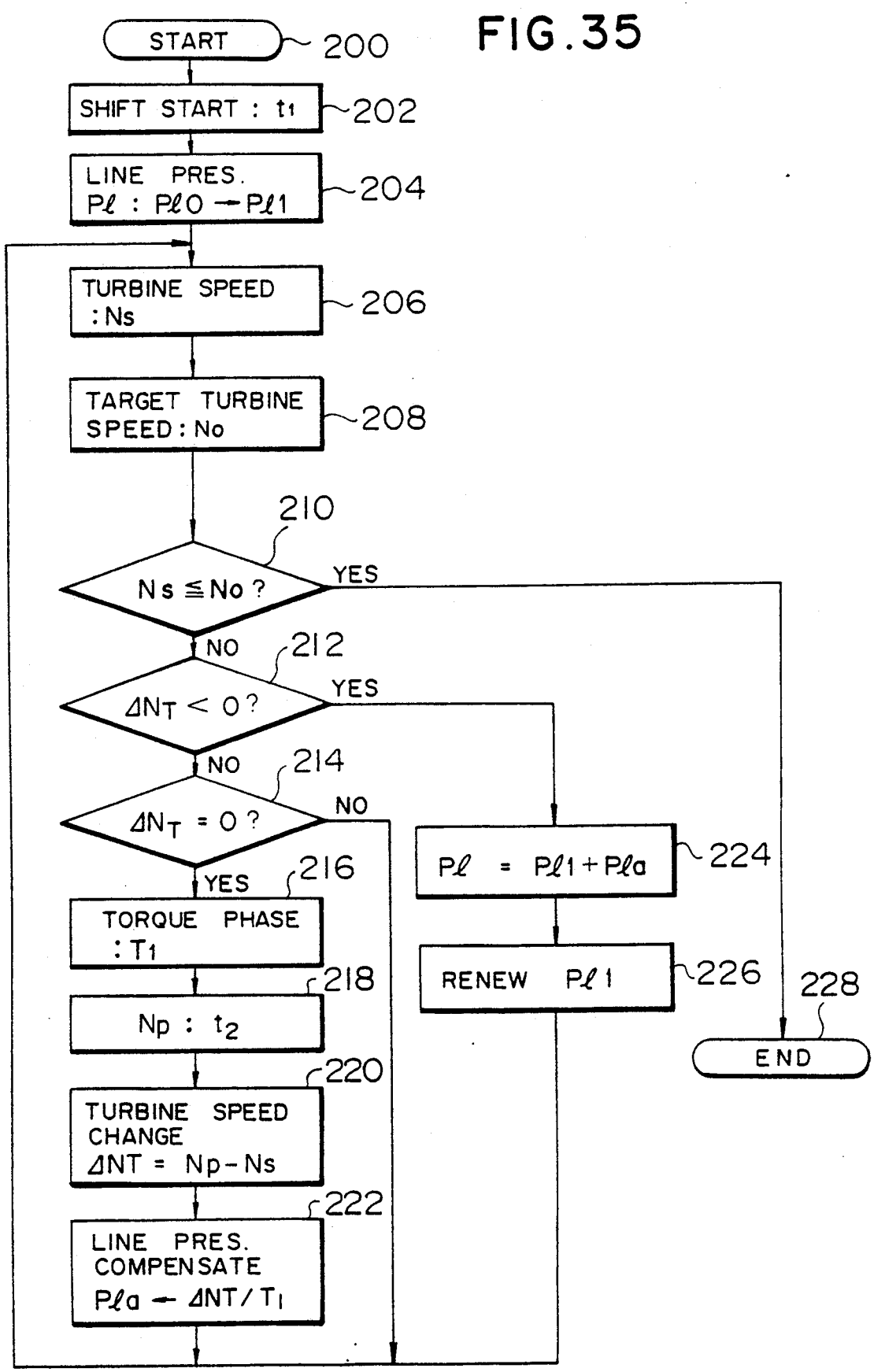
FIG. 35 a view showing a flow chart in accordance with the embodiment of FIG. 33.

Referring to FIGS. 33, 34 and 35, still another embodiment is described. Referring to FIG. 33, there is shown a relationship between the turbine speed and the line pressure.

In this illustrated embodiment, the compensating value P1a is obtained through a graph shown in FIG. 34 based on a ratio of the turbine speed change amount ΔNT to the torque phase period $T_1$ in step 222 of a flow chart in FIG. 35.

According to the present invention, the line pressure is controlled in terms of the learning control in such a manner that the time period T for the shift operation is controlled to the target value $T_o$ while preventing the turbine speed rise, the turbine speed depression and the turbine torque depression during the shift operation.

Although the above embodiments are described in connection with the up-shift operation. However the present invention can be applied for the down-shift operation as well.

In another embodiment, the speculative turbine speed or input member speed of the transmission gear mechanism is obtained based on the gear ratio before the shift operation and the vehicle speed. The turbine speed raising is obtained based on the difference between the speculative value and the actual turbine speed detected. Thus, the turbine speed rise when produced, can be accurately obtained so that the line pressure can be properly controlled to suppress the torque shock during shift operation effectively.

In still another embodiment, the line pressure in the inertia period or the final stage of the shift operation is changed based the turbine speed and the time period of the torque phase period or initial stage. Alternatively, the line pressure in the inertia phase period is changed based on the turbine speed change amount or the ratio of the turbine speed change amount to the time period of the torque phase period. Thus, the line pressure can be promptly compensated during the shift operation so as to suppress the torque shock during the shift operation due to the turbine raising, turbine depression and torque depression.

It will be apparent that various modifications and improvements can be made based on the above description by those skilled in the art without departing from the spirit of the present invention, but that all of such modifications fall in the scope of the present invention as claimed.

What is claimed is:

1. A line pressure control system for an automatic transmission comprising:
    a shift stage transmission gear mechanism having a plurality of power transmitting paths of different speed ratios,
    line pressure control means for controlling a line pressure for operating frictional elements of the transmission gear mechanism associated with each other to establish a desirable shift gear stage,
    shift period detecting means for detecting a time period for a shift operation accomplished by the frictional elements operated by the line pressure,
    first compensating means for controlling the line pressure in terms of a learning control in a manner that the time period for the shift operation is controlled to a target value,
    abnormality detecting means for detecting an abrupt change in operating condition of the transmission, and
    second compensating means for compensating the line pressure prior to compensation of the line pressure by the first compensating means when the abrupt change is detected.

2. A line pressure control system as recited in claim 1, wherein the abnormality detecting means detects an abrupt rise of a rotation speed of an input member of the automatic transmission during the shift operation.

3. A line pressure control system as recited in claim 1, wherein the abnormality detecting means detects a depression in a rotation speed of an input member of the automatic transmission during the shift operation.

4. A line pressure control system as recited in claim 1, wherein the abnormality detecting means detects a depression in a driving torque transmitted through frictional elements of the transmission gear mechanism during the shift operation.

5. A line pressure control system as recited in claim 1, wherein the line pressure control means comprises a duty solenoid valve for controlling a pilot pressure of a line pressure control valve so that the line pressure is controlled.

6. A line pressure control system as recited in claim 1, wherein the second compensating means increases the line pressure so as to increase the torque capacity of an on-coming frictional element of the transmission gear mechanism when the rotation speed of an input member of the transmission gear mechanism is abruptly increased during the shift operation.

7. A line pressure control system as recited in claim 1, wherein the second compensating means decreases the line pressure so as to reduce the torque capacity of an off-going frictional element of the transmission gear mechanism when the turbine speed is abruptly decreased during the shift operation.

8. A line pressure control system as recited in claim 1, wherein the second compensating means decreases the line pressure so as to reduce the torque capacity of an off-going frictional element of the transmission gear mechanism when a torque depression is produced during the shift operation.

9. A line pressure control system for an automatic transmission comprising:
    a shift stage transmission gear mechanism having a plurality of power transmitting paths of different speed ratios,
    line pressure control means for controlling a line pressure for operating frictional elements of the transmission gear mechanism associated with each other to establish a desirable shift gear stage,
    input member speed detecting means for detecting a rotation speed of an input member of the transmission gear mechanism, said rotation speed reaching both a peak value and a minimum value during a shift operation,
    speculating means for obtaining a speculative speed of the input member of the transmission after the shift operation based on the speed ratio and a vehicle speed before the shift operation, said shift operation being in a torque phase period before said rotation speed reaches said peak value and in an inertia phase period when said rotation speed is between said peak value and said minimum value,
    speed change processing means for obtaining a rotation speed rise of an actual rotation speed of the input member detected by the input member detecting means from the speculative speed of the input member, and line pressure compensating means for compensating the line pressure so as to reduce the rotation speed rise by obtaining a compensating value, based on the torque phase period and the rotation speed rise, in said inertia phase period.

10. A line pressure control system as recited in claim 9, wherein the line pressure control means comprises a duty solenoid valve for controlling a pilot pressure of a line pressure control valve so that the line pressure is controlled.

11. A line pressure control system as recited in claim 9 wherein the line pressure compensating means compensates the line pressure in the inertia phase period during the shift operation based on a ratio of the rotation speed rise of the input member of the transmission gear mechanism to a length of the torque phase period.

* * * * *